US008165386B1

(12) United States Patent
Moon et al.

(10) Patent No.: US 8,165,386 B1
(45) Date of Patent: Apr. 24, 2012

(54) APPARATUS AND METHOD FOR MEASURING AUDIENCE DATA FROM IMAGE STREAM USING DYNAMICALLY-CONFIGURABLE HARDWARE ARCHITECTURE

(76) Inventors: Hankyu Moon, State College, PA (US); Kevin Maurice Irick, State College, PA (US); Vijaykrishnan Narayanan, State College, PA (US); Rajeev Sharma, State College, PA (US); Namsoon Jung, State College, PA (US)

( * ) Notice: Subject to any disclaimer, the term of this patent is extended or adjusted under 35 U.S.C. 154(b) by 499 days.

(21) Appl. No.: 12/583,323

(22) Filed: Aug. 18, 2009

(51) Int. Cl.
*G06K 9/62* (2006.01)
(52) U.S. Cl. .......................................... 382/156; 706/15
(58) Field of Classification Search .................. 382/155, 382/156, 157, 158; 706/15, 16, 17
See application file for complete search history.

(56) References Cited

U.S. PATENT DOCUMENTS

| | | | |
|---|---|---|---|
| 5,093,900 A | | 3/1992 | Graf |
| 5,533,169 A * | | 7/1996 | Burnod et al. .................. 706/41 |
| 5,751,913 A | | 5/1998 | Chiueh et al. |
| 6,324,532 B1 * | | 11/2001 | Spence et al. .................... 706/27 |
| 7,099,510 B2 * | | 8/2006 | Jones et al. .................. 382/225 |
| 7,840,037 B2 * | | 11/2010 | Lu et al. ........................ 382/118 |
| 2008/0120260 A1 | | 5/2008 | Yancey |

OTHER PUBLICATIONS

Aibe, N., et al., "A probabilistic neural network hardware system using a learning-parameter architecture," Neural Networks, Proceedings of 2002 IJCNN, vol. 3, pp. 2270-2275.
Bermak, A., et al., "A reconfigurable hardware implementation of tree classifiers based on a custom chip and a CPLD for gas sensors applications," Proceedings of 2004 IEEE TENCON, vol. 1, pp. 32-35.
Biasi, I., et al., "A reconfigurable parallel architecture for SVM classification," in Proceedings of IJCNN '05, vol. 5, pp. 2867-2872.
Mizuno R., et al., "Reconfigurable architecture for probabilistic neural network system," in Proceedings of IEEE Int'l Conf on Field-Programmable Technology, 2003, pp. 367-370.
Reyna-Rojas, R., et al., Object recognition system-on-chip using the support vector machines, EURASIP J. Appl. Signal Process, 2005 1, pp. 993-1004.
Starzyk, J., et al., "Reconfigurable self-organizing NN design using virtex FPGA," Proc. Int'l Conf on Engineering of Reconfigurable Systems and Algorithms (ERSA), Las Vegas, NV, Jun. 2001.

* cited by examiner

*Primary Examiner* — Vikkram Bali

(57) ABSTRACT

The present invention is an embedded audience measurement platform, which is called HAM. The HAM includes hardware, apparatus, and method for measuring audience data from image stream using dynamically-configurable hardware architecture. The HAM provides an end-to-end solution for audience measurement, wherein reconfigurable computational modules are used as engines per node to power the complete solution implemented in a flexible hardware architecture. The HAM is also a complete system for broad audience measurement, which has various components built into the system. Examples of the components comprise demographics classification, gaze estimation, emotion recognition, behavior analysis, and impression measurement.

20 Claims, 20 Drawing Sheets

APPARATUS AND METHOD FOR MEASURING AUDIENCE DATA FROM IMAGE STREAM USING DYNAMICALLY-CONFIGURABLE HARDWARE ARCHITECTURE

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of the Invention

The present invention is a hardware, apparatus, and method for measuring audience data from image stream using dynamically-configurable hardware architecture, wherein dynamically-reconfigurable computational modules are used as engines per node to power the complete solution implemented in a flexible hardware architecture, and the computational modules comprise demographics classification, gaze estimation, emotion recognition, behavior analysis, and impression measurement.

2. Background of the Invention

The role of digital media for advertisement in public spaces is becoming increasingly important. The task of measuring the degree of media exposure is also deemed as very important both as a guide to the equipment installation (equipment kind, position, size, and orientation) and as a rating for the content programming. As the number of such displays is growing, measuring the viewing behavior of the audience using human intervention and other segmentation information, such as demographic information of the audience, can be very costly. Therefore, there is a need to develop a novel embedded audience measurement platform. The present invention is a hardware, apparatus, and method for measuring audience data from image stream using dynamically-configurable hardware architecture. In many of the audience measurement applications, it is also necessary to employ multiple cameras along with processing hardware where an intelligent coordination between the multiple hardware is potentially beneficial to the accurate measurement.

Previous attempts for a reconfigurable classification system, especially for the hardware implementation of reconfigurable classification, are discussed.

For example, U.S. Pat. Appl. Pub. No. 2008/0120260 of J. W. Yancey (hereinafter Yancey) disclosed a system and method for reconfigurable neural networks that utilize interconnected field programmable gate array (FPGA). In Yancey, the neural networks are highly reconfigurable in that the neural network nodes communicate with each other using dynamic packet routing rather then fixed node interconnections. Each FPGA has a packet router that provides communication connection both to the neural network nodes internal to the FPGA and to the neural network nodes in external FPGAs. A neural network controller is coupled to an FPGA neural network array and is configured to provide input, management, and control data to the FPGAs within the FPGA neural network array. The controller includes a plurality of different tasks. The neural network array is then configured to perform the selected task and operates on the input according to the selected task.

Although Yancey disclosed a reconfigurable neural network method, Yancey is entirely foreign to the classification or recognition of images or video data. In addition, Yancey is limited to only neural networks that utilize interconnected FPGAs and does not explicitly teach any other classification algorithms, whereas in the present invention, the computational module can embrace any kind of classification algorithms in the hardware architecture. In addition, any application involving combinations of classifiers is implementable by specifying a process graph for computational modules in the present invention.

Reyna-Rojas, R., D. Houzet, D. Dragomirescu, F. Carlier, and S. Ouadjaout, Object recognition system-on-chip using the support vector machines, EURASIP J. Appl. Signal Process, 2005, 1, Jan. 2005, pp. 993-1004 (hereinafter Reyna-Rojas) disclosed a design of a reconfigurable and programmable system-on-chip platform for real-time object recognition. Especially Reyna-Rojas teaches an implementation of support vector machine (SVM) classifier on a system-on-chip (SoC) platform in order to exploit the parallel nature of the SVM algorithm. The reconfiguration is performed by a C program on LEON2 SPARC processor, with dynamically-constructed vector instructions. This reconfigurable preprocessing links the parameters of the main loop of the SVM algorithm that is executed at vector processing unit at runtime. Reyna-Rojas limited classification algorithm to support vector machine algorithm. In the present invention, on the other hand, any kind of reconfigurable classification algorithms can be used.

U.S. Pat. No. 5,093,900 of H. P. Graf (hereinafter Graf) disclosed a method and system for a reconfigurable neuron using analog technique in a neural network. Graf teaches, in the reconfigurable neuron, digital input data are multiplied by programmable digital weights in a novel connection structure. The sum signal is multiplied by programmable scalar values. Scalar values can be adjusted according to the portion of input data if input data and weights have multilevels. This signal is passed through a programmable build out circuit which permits neural network reconfiguration by interconnection of one neuron to one or more other neurons.

Although Graf implemented a reconfigurable neural network with programmable weight values and flexible interconnection of the neurons, Graf is foreign to the idea of enabling multiple classifiers in the architecture. Furthermore, in the present invention, the multiple classifiers can consist of not only neural network algorithms, but also any kind of classification algorithm. In the present invention, the multiple classifiers can be combined to measure the audience information, such as behavioral and demographic attributes.

U.S. Pat. No. 5,751,913 of T-D. Chiueh, et al. (hereinafter Chiueh) disclosed a method of reconfigurable neural network including difference-square type neurons. In Chiueh, reconfigurable neural network includes a plurality of switches each having at least two conductive leads. The switches are programmed so that the data flow direction of the conductive leads of the switches can be selected reconfigurable. Additionally, each neuron called processing element (PE) of the reconfigurable neural network has a serial-in-serial-out processing that is interconnected through the plurality of switches. These PEs are selected to form a layer. The switch boxes connected to the input leads of these PEs are each configured to select their input lead to electrically connect to the other PE's output lead. Chiueh disclosed a reconfigurable neural network using reconfigurable neuron structure and allowed a programmable weight value and flexible interconnection between each PE. However, Chiueh is also foreign to the idea of enabling multiple classifiers.

Janusz A. Starzyk and Yongtao Guo, "Reconfigurable Self-Organizing NN Design Using Virtex FPGA", Proc. Int. Conf. on Engineering of Reconfigurable Systems and Algorithms (ERSA) Las Vegas, Nev., June 2001 (hereinafter Janusz) disclosed a method and system for self-organizing neural network model with entropy-based evaluator. In Janusz's self-organization architecture, the neural network is a feed forward structure that can decide the interconnections of neurons and neuron operations, and the entropy-based evaluator (EBE) is utilized to select an operation and input selection for each neuron.

Janusz's algorithm for digital implementation of neural network based on system entropy is foreign to the idea of enabling a combination of classification algorithms as does the present invention. Janusz implemented a single neural network classification algorithm for a single data set. In addition, Janusz is entirely foreign to the idea of developing an architecture designed for audience measurement.

Bermak, A. and D. Martinez, "A reconfigurable hardware implementation of tree classifiers based on a custom chip and a CPLD for gas sensors applications," in Proceedings of the IEEE TENCON 2004 IEEE Region 10 Conference, Vol. 1, pp. 32-35, 21-24 Nov. 2004 (hereinafter Bermak) disclosed a system and method of a reconfigurable decision tree hardware architecture that can be programmed in terms of topology and processing precision allowing the user to externally set the decision parameters. In decision tree, each node in the tree is a Threshold Logic Unit (TLU) implementing a linear discriminant and each leaf is associated to a given class. In VLSI implementation of this system, Bermak used a reconfigurable custom chip for implementation of TLU. 4 by 4 array of processing element (PE) that implements TLU internally is configured in terms of decision tree topology.

Bermak used a combination of linear discriminant for reconfigurable decision tree implementation. Bermak's implementation based on decision tree algorithm can process only one data set classification, whereas the present invention allows several classifier algorithms in the architecture so that each of the classifiers can process its own data set where the data sets among the classifiers can be different from each other.

Biasi, I., A. Boni, and A. Zorat, "A reconfigurable parallel architecture for SVM classification," in Proceedings of IJCNN '05, Vol. 5, pp. 2867-2872, 31 Jul.-4 Aug. 2005 (hereinafter Biasi) disclosed a method of hardware implementation of SVMs on reconfigurable FPGAs. Biasi suggested a new architecture called KBLAZE, in which Biasi used an external memory to store the parameters of the classification function so that the architecture can overcome a limited memory space problem. Biasi also used a 32-bit MicroBlaze RISC processor as a control unit to improve the performance bottleneck, a parallel computation module of the dot product, and multiple copies of KBLAZE on the same FPGA to improve the classification time through parallel processing. Biasi is entirely foreign to the idea of facilitating multiple classification algorithms to measure the behavioral and demographic attributes of audience.

Mizuno, R., N. Aibe, M. Yasunaga, and I. Yoshihara, "Reconfigurable architecture for probabilistic neural network system," in Proceedings of IEEE International Conference on Field-Programmable Technology (FPT), 2003, pp. 367-370, 15-17 Dec. 2003 (hereinafter Mizuno) disclosed a reconfigurable architecture for the probabilistic neural network (PNN), in which the preprocessing circuits can be reconfigurable as well as the PNN. For reconfigurable PNN processor using FPGA, Mizuno referenced a prior implementation, disclosed in Aibe, N.; Yasunaga, M.; Yoshihara, I.; Kim, J. H., "A probabilistic neural network hardware system using a learning-parameter parallel architecture," Neural Networks, IJCNN '02, in Proceedings of 2002 IJCNN, Vol. 3, pp. 2270-2275, 2002 (hereinafter Aibe). Aibe proposed the sigma parallel architecture in which every processor calculates the same neuron with the different value of the smoothing parameter to overcome the limitation in the number of neurons due to the shortage of I/O pins in the chip. Mizuno noted, in the PNN system, Mizuno used three FPGA chips for the PNN processor, image preprocessing, and process control, in which reconfigurability of the preprocessor and of the PNN processor is closely related to the high system performance.

Mizuno's system is limited to the specific PNN classification algorithm implementation, unlike the present invention. In addition, Mizuno is also entirely foreign to the idea of a hardware implementation that is used for audience measurement.

SUMMARY

The present invention is an embedded audience measurement platform, which is called HAM. The HAM includes hardware, apparatus, and method for measuring audience data from image stream using dynamically-configurable hardware architecture. The HAM comprises a digital circuitry system or IC that embodies the components of the present invention. The HAM provides an end-to-end solution for audience measurement, wherein impression and demographics are exemplary basic units that can be used as engine per node to power the complete solution implemented in a flexible hardware architecture. The HAM is also a complete system for a broad audience measurement, which has various video analytic components built into the system. Examples of the components comprise demographics classification, gaze estimation, emotion recognition, behavior analysis, and impression measurement.

The audience measurement is performed based on the execution of the video analytic algorithms that are programmed in the components of the HAM. The algorithms, i.e., a plurality of task-specific computer vision technologies in the components, are applied to input images from a video source. It is an objective of the present invention to efficiently handle complex computational tasks, including human behavior and demographic analysis, from the video source, utilizing the novel and flexible hardware architecture in a preferred embodiment.

The embodiment of the present invention can be used for many application areas, which include but are not limited to the measurement of the audience engagement with the digital signage or out-of-home media, the impression level of the audience to the media, the calculation of the rating of media contents based on the audience response to the media, the customization of media content for a targeted advertising based on the audience measurement, and audience-sensitive in-store marketing. This audience measurement data by the HAM can also contribute to a more complex analysis of the audience in combination with other data sources, such as a media player log, sales data, demographic information for a specified geography, and data from traditional research, to provide an in-depth understanding about the audience in the given measurement environment, such as a retail store or a public space, to the decision maker of the environment.

Various audience measurement output, such as the duration of the watch during which the audience in the image watches the media, impression level, count of audience, emotional status change, gaze movement, and the segmentation information of the audience in the field-of-view of the image sensor, are produced from the HAM, and used for the various application areas. For example, the output can be used to provide informative data that will make it possible for advertisers and media owners to determine the value of the media, and thus buy and sell advertising time on a media network. In this example, the data can be used to develop ratings relevant to media measurement, such as opportunity to see (OTS), gross rating points (GRP), cost per thousand gross impressions (CPM), engagement, and impression duration.

Although the audience measurement based on video analytics involves different tasks and each task carries out different processing, the tasks have common computational and algorithmic tools to realize the task-specific program, such as neural network (NN), support vector machine (SVM), or image filters, while each computational module also needs a different set of parameters (models, weights, etc.) for different tasks. A small set of such common computational modules (NN module, SVM module, etc.) can be re-used to carry out different tasks. Therefore, the HAM reconfigures the high-level topology of the computational modules to carry out various tasks in the audience measurement.

From another approach, it may be beneficial to employ the same scheme to implement some classifier architecture that utilizes a combination of classifiers, such as boosting algorithms. It is one of the objectives of the present invention to provide a unified schema for inter-module capability and output format sharing. In this approach, a boosting framework can be utilized to support the classifiers that are resident in the system. In the present invention, a boosting can be defined as the environment within which the modules are instantiated. Any module may use the outputs of any other module(s) through the boosting interface to form a cascade of weak classifiers.

The hardware platform can statically be configured for a different algorithm such as face detection or expression recognition. This can enable "spatial diversity" where different instances of the same hardware implement a different algorithm. It also provides "temporal reconfiguration" where the same hardware can implement a different algorithm at a different time. This can be more broadly classified as dynamic adaptation to environment. The dynamic adaptation of implemented algorithm(s) is based on a dynamically-recognized scene. The dynamic adaptation to resource constraints makes it easier to change the algorithm implemented on one instance of the hardware based on the configuration of adjacent nodes.

Scene-based dynamic reconfiguration in the present invention may be of benefit in certain cases. For example, if many faces get detected, the system can ignore some neural network weights that are negligible or support vectors that have low weights in order to ease the load.

The HAM is portable and standalone, and can allow the usage of only a subset of the system if it is configured in such a manner, due to its reconfigurability, thus saving energy. For example, during the night, the HAM can be configured to process a limited task to reduce the energy consumption.

Supervising Control

The present invention embodies a supervising control to change the hardware configuration in executing the computational modules in the system. The supervising control monitors the external or internal environment to make a decision of whether or not it is necessary to reconfigure the system to adjust to the changes in environment. The external environment can be the audience flow, the demographic composition of the audience, or the system users' needs. The internal environment can be an overall hardware resource load or unbalance of load among components. The supervising control then makes a decision about how to change the hardware configurations to adapt to the given environment.

The supervising control utilizes a process graph that encodes the new configuration of computational modules to carry out a different task or to carry out the same task by utilizing the computational resource differently. The process graph represents the choices of computational modules from a given pool of computational modules and the connections among them according to the graphical structure mandated by the graph. It effectively makes up a procedure to carry out an audience measurement application.

Constructed from the supervising control, the process graph can realize various audience measurement applications, including demographics classification, emotion recognition, impression measurement, behavior analysis, and gaze estimation. In an exemplary embodiment, each of the computational modules represents an implementation of a specific computational function, such as a neural network, support vector machine, etc. The process graph can effectively map the topology of the processes necessary for the given application, by specifying the presence/absence of directional links between the computational modules. The process graph can also include information other than the linkage, such as the pointers to parameters necessary for the given computational modules to carry out the applications. Decision making criteria, regarding the ways in which the processing should continue, can be specified for each potential link between the computational modules. In decision making criteria, the output from each step is compared against a given threshold and the next step of the processing is determined by the outcome of the comparison.

DRAWINGS

Figures

DETAILED DESCRIPTION OF THE INVENTION

Figure 1:
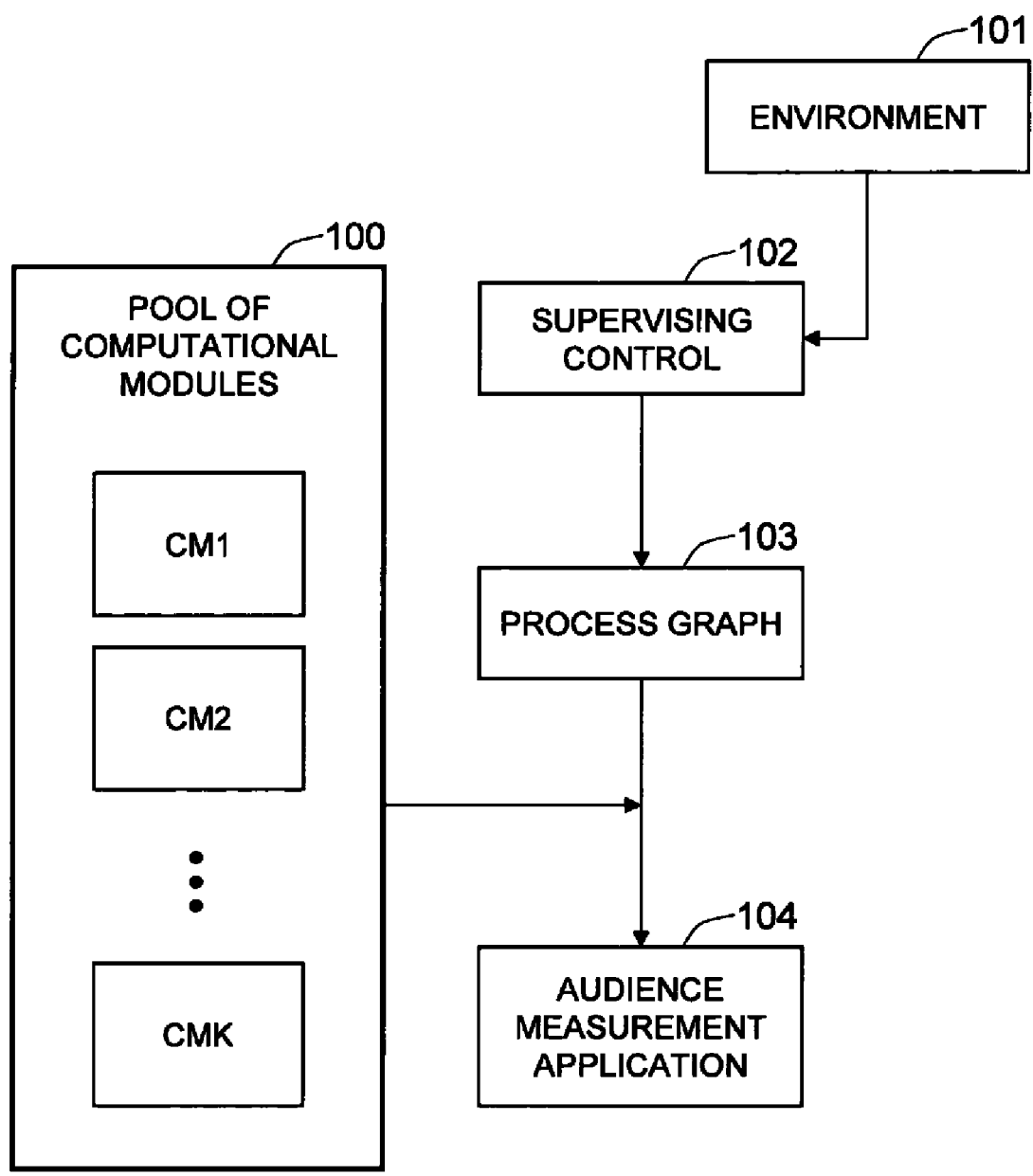
FIG. 1 is an overview of the system in an exemplary embodiment of the present invention.

FIG. 1 is an overview of the system in an exemplary embodiment of the present invention.

The present invention is an embedded audience measurement platform, which is called HAM. The HAM includes hardware, apparatus, and method for measuring audience data from image stream using dynamically-configurable hardware architecture. The HAM comprises a digital circuitry system or IC that embodies the components of the present invention. The HAM provides an end-to-end solution for audience measurement, wherein computational modules, such as a module for impression measurement or a module for demographics classification, can be used as engines per node to power the complete solution implemented in a flexible hardware architecture. The HAM is also a complete system for broad audience measurement, which has various components built into the system. Examples of the components comprise demographics classification, gaze estimation, emotion recognition, behavior analysis, and impression measurement.

Generality and Reusability Among Different Computational Modules

Although the audience measurement based on video analytics involves different tasks and each task carries out different processing, all of these tasks take video signal as inputs. The tasks have common computational and algorithmic tools to realize the task-specific program, such as a neural network (NN), support vector machine (SVM), or image filters, while each computational module also requires a different set of parameters (models, weights, etc.) for different tasks. A small set of such common computational modules (NN module, SVM module, etc.) can be reused to carry out different tasks. Therefore, based on this idea of the common computational elements, the HAM reconfigures the high-level topology of the computational modules to carry out various tasks in the audience measurement.

Medium Size Grain Generality

From another approach, it may be beneficial to employ the same scheme to implement some classifier architecture that utilizes a combination of classifiers, such as boosting algorithms. For example, in the AdaBoost algorithm, many weak classifiers are combined to perform a strong classification. The strong classifiers are again combined to perform a given task of classification. In one of the exemplary embodiments, each weak classifier can take the role of a computational module. Then, the boosted architecture of a strong classifier can be implemented through a graphical link where weak classifiers are the vertices of the graph. The tree structure of decision making can be realized by a decision criterion at each edge of the graph. At one higher level, the combination of strong classifiers to perform the final classification can also be implemented by regarding each strong classifier as a vertex and each decision criterion as an edge of a higher-level process graph.

The present invention can provide a unified schema for inter-module capability and output format sharing. For example, an SVM module configured on our platform may, in a standard scheme, publish the following information to other modules in the system scheme:

1) The current classification task (gender, face detection, emotion, and so on).

2) The format of results generated by the module (frame index (integer), image region (box), classification (e.g., 1=type A, 2=type B)).

3) A list of other modules that currently subscribe to the classification results generated by the module.

In this approach, a boosting framework can be utilized to support the classifiers that are resident in the system. In the present invention, a boosting can be defined as the environment within which the modules are instantiated. Any module may use the outputs of any other module(s) through the boosting interface to form a cascade of weak classifiers.

Reconfigurability

The hardware platform can statically be configured for a different algorithm, such as face detection or expression recognition. This can enable "spatial diversity" where different instances of the same hardware implement a different algorithm. It also provides "temporal reconfiguration" where the same hardware can implement a different algorithm at a different time. For example, appropriate light correction can be applied based on whether it is natural daylight or artificial lighting. This can be more broadly classified as dynamic adaptation to environment.

The dynamic adaptation of implemented algorithm(s) is based on a dynamically-recognized scene. For example, if there are more than five faces recognized in a scene, the hardware configures to provide more resources for face detection and disables expression recognition. The resources for expression recognition can then be used for faster face detection.

The dynamic adaptation to resource constraints makes it easier to change the algorithm implemented on one instance of the hardware based on the configuration of adjacent nodes. For example, if three of four cameras need to be switched off in the night, then the configuration of the fourth camera can be adjusted appropriately, either to aggregate the entire functionality of the set of cameras in the night, or to have a more specific coordinated algorithm with neighboring cameras in the day.

Scene-based dynamic reconfiguration in the present invention may be of benefit in certain cases. For example, if many faces get detected, the system can ignore some neural network weights that are negligible or support vectors that have low weights, in order to ease the load. In another example, the system may need to switch to different face detector or demographics classifier parameters trained for a specific environment, such as in an environment where the lighting condition in the environment gets harsh and the input images from the environment does not provide optimal input data for the video analytic processing. In another example with regard to the emotion recognition, if there are too many faces in the environment and the emotion recognition requires heavy usage of the resource, the process of emotion recognition can become too expensive in terms of processing time. In this case, the hardware can be devoted to face detection for some period of time, and the emotion recognition can run on sampled faces rather than on all of the detected faces.

The HAM is portable and standalone, and can allow a usage of only a subset of the system if it is configured in such a manner, due to its reconfigurability, thus saving energy. For example, during the night, the HAM can be configured to process a limited task to reduce the energy consumption.

The exemplary output calculated by the computational modules in HAM includes audience size per demographics, demographics, duration of viewing, emotion, audience flow, and sub-screen gaze.

In the exemplary embodiment shown in FIG. 1, the supervising control 102 monitors the external or internal environment to make a decision whether or not it is necessary to reconfigure the system to adjust to the changes in environment. The external environment can be the audience flow, demographic composition of the audience, or the system users' needs. The internal environment can be the overall hardware resource load or the unbalance of load among components. The supervising control 102 then makes a decision about how to change the hardware configurations to adapt to the given environment.

It constructs a process graph 103, which encodes the new configuration of computational modules 100 to carry out a different task or to carry out the same task by utilizing the computational resource differently; the process graph 103 represents the choices of computational modules from a given pool of computational modules 100 and the connections among them according to the graphical structure mandated by the graph; it effectively makes up a procedure to carry out an audience measurement application 104.

Figure 2:
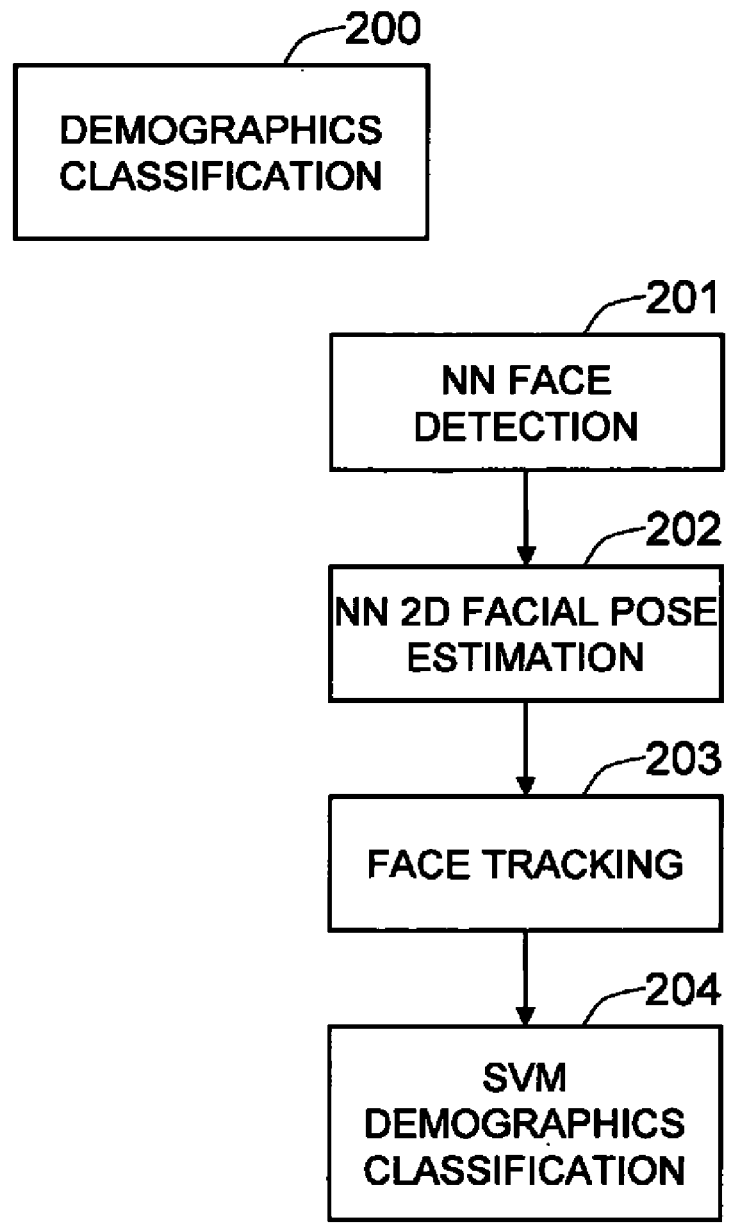
FIG. 2 shows an exemplary demographics classification application, which is an exemplary audience measurement application that can be implemented by the architecture of the present invention.

FIG. 2 shows an exemplary demographics classification application, which is an exemplary audience measurement application that can be implemented by the architecture of the present invention.

The first two computational modules—face detection 201 and 2D facial pose estimation 202—utilize neural networks in this example. The next computational module is a face tracker 203. The last computational module is support vector machine (SVM) demographics classification 204. The application can be realized through the graphical structure of the directional links represented by the process graph 103 within the present reconfiguration architecture. More specifically, the order of the directional graph simply translates into the order of the individual computational modules to be processed.

Figure 3:
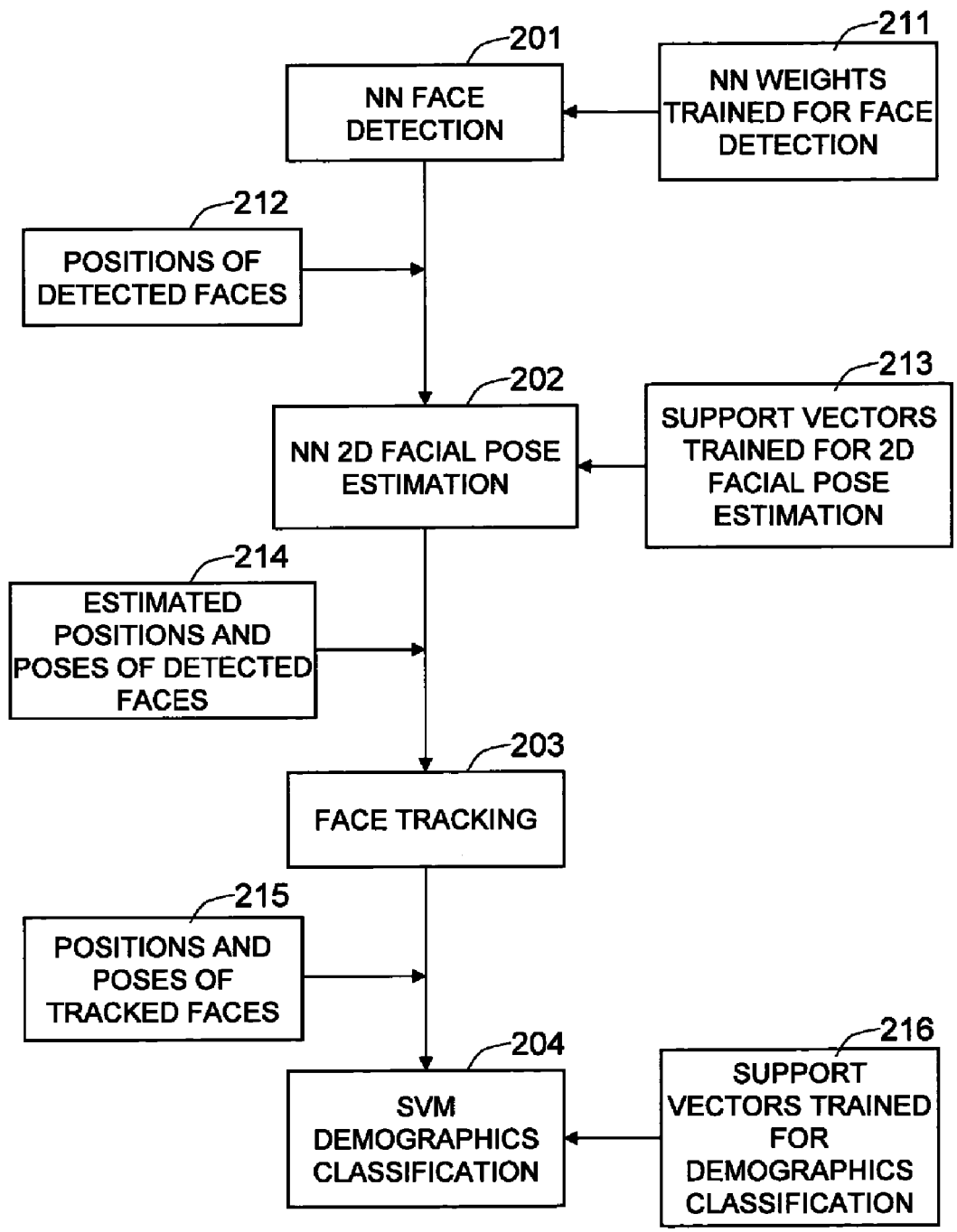
FIG. 3 shows an exemplary data access and transfer scheme in the demographics classification application, which is an exemplary audience measurement application that can be implemented by the architecture of the present invention.

FIG. 3 shows an exemplary data access and transfer scheme in the demographics classification application, which is an exemplary audience measurement application that can be implemented by the architecture of the present invention.

As described in the previous figure, the order of the directional graph simply translates into the order of the individual computational modules to be processed. Any parameters necessary to run a computational module—such as model parameters of neural networks or support vectors for SVM—can be specified through a reference address (to the parameter data) tied to the nodes of the process graph 103. Any intermediate data that need to be passed to the next computational module can be specified through a reference address tied to the links of the process graph 103. For example, the NN face detection step will need to access a trained NN weight for face detection 211. Then the locations of detected faces 212 will be passed down to the NN 2D facial pose estimation step. The step will also access a set of support vectors chosen to estimate the facial poses 213. The estimated position and pose of each of the faces 214 will be passed to the face tracking 203 step. The face tracking 203 step will then make correspondences among the detected and pose estimated faces 214 and keep the positions and sizes of individually tracked faces 215. The SVM demographics classification 204 step will then read the stored support vectors 216. The step will utilize the position and size data of the tracked faces to extract facial images and feed them to the SVM classifier. The SVM classifier will determine the demographic labels of these faces.

Figure 4:
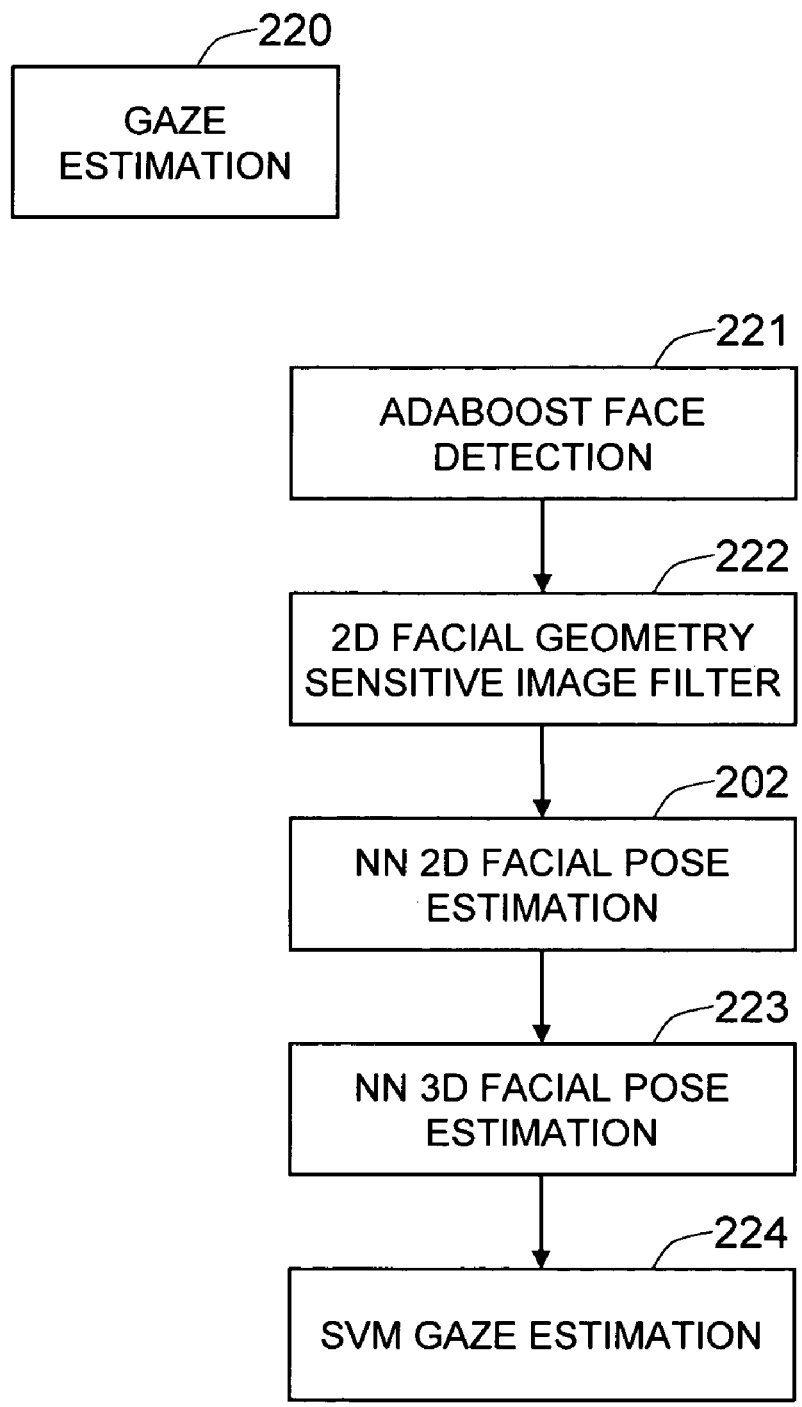
FIG. 4 shows an exemplary gaze estimation application, which is an exemplary audience measurement application that can be implemented by the architecture of the present invention.

FIG. 4 shows an exemplary gaze estimation application, which is an exemplary audience measurement application that can be implemented by the architecture of the present invention.

The AdaBoost face detection 221 is followed by a 2D facial geometry-sensitive image filter 222. Then, a neural network (NN) 2D facial pose estimation 202 is performed to achieve a more accurate NN-based 3D facial pose estimation 223. The last computational module is SVM-based gaze estimation 224.

The application can be realized through the graphical structure of the directional links represented by the process graph 103 within the present reconfiguration architecture. The pool of computational modules can comprise Adaboost classifier, neural networks, image filters, and SVMs. The data access and transfer schemes among the computational modules can be implemented in a similar manner as described with regard to the demographics classification application in FIG. 3.

Figure 5:
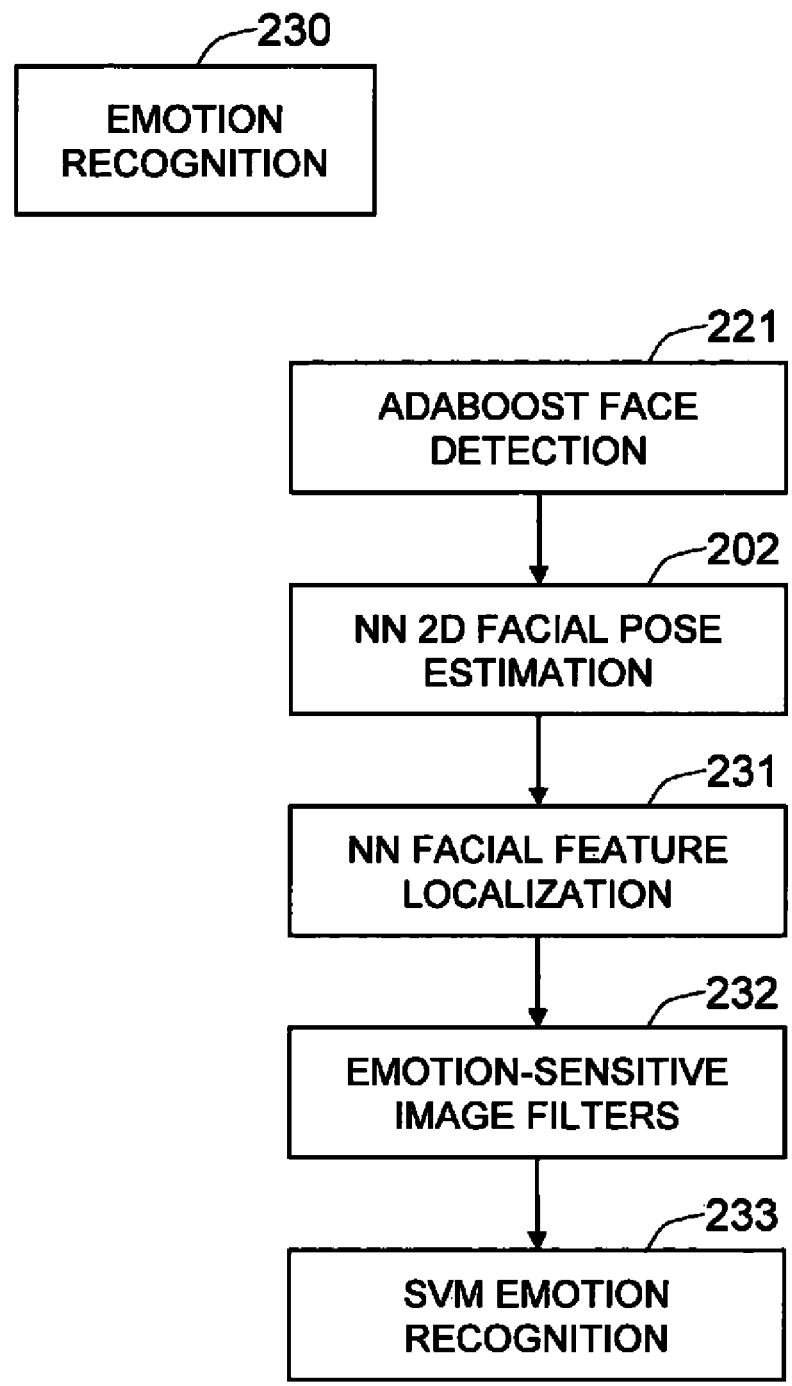
FIG. 5 shows an application of emotion recognition, which is an exemplary audience measurement application that can be implemented by the architecture of the present invention.

FIG. 5 shows an application of emotion recognition, which is an exemplary audience measurement application that can be implemented by the architecture of the present invention.

The AdaBoost face detection 221 is followed by NN 2D facial pose estimation 202 to accurately align detected faces. Then, the facial features are detected in the NN facial feature localization 231 module. The emotion-sensitive image filters 232 are applied to each of the detected facial features to extract image features that are utilized in the next SVM emotion recognition 233 module.

The application can be implemented through the graphical structure of the directional links represented by the process graph 103 within the present reconfiguration architecture. The pool of computational modules can comprise Adaboost classifier, neural networks, image filters, and SVMs. The data access and transfer schemes among the computational modules can be implemented in a similar manner as described with regard to the demographics classification application in FIG. 3.

Figure 6:
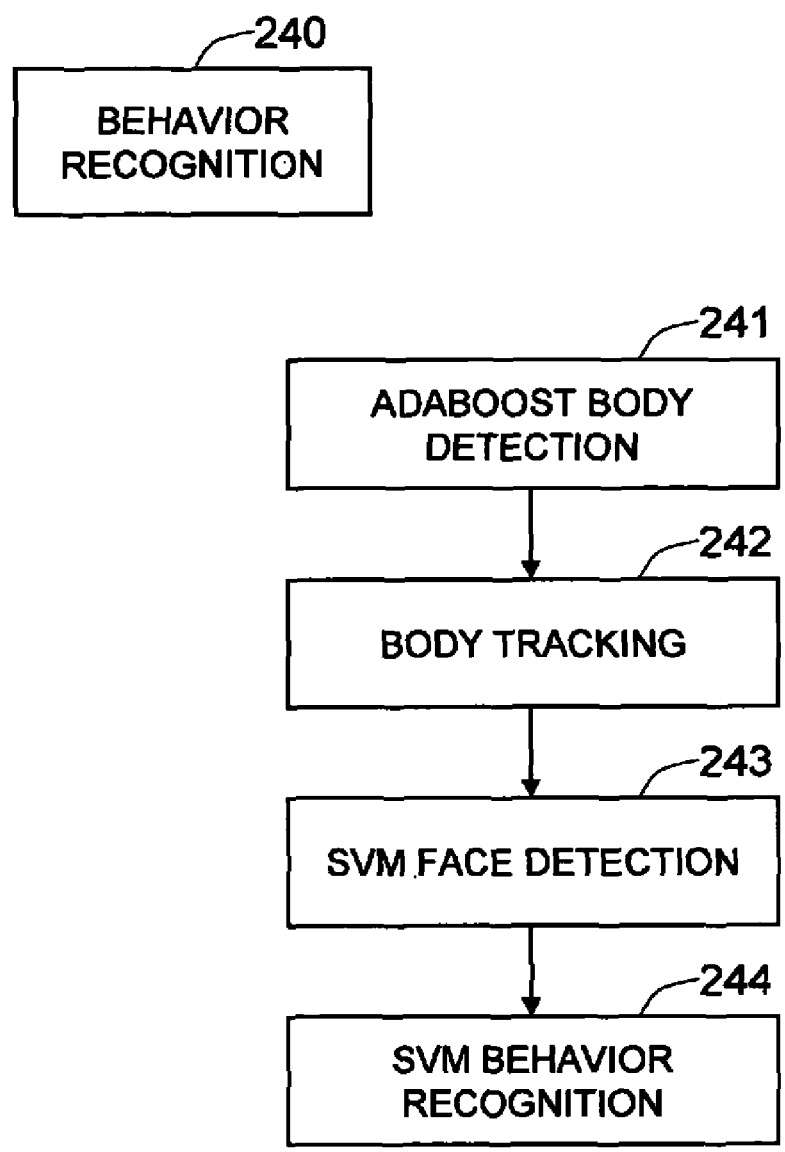
FIG. 6 shows an application of human behavior recognition, which is an exemplary audience measurement application that can be implemented by the architecture of the present invention.

FIG. 6 shows an application of human behavior recognition, which is an exemplary audience measurement application that can be implemented by the architecture of the present invention.

The AdaBoost body detection 241 is followed by body tracking 242 to make correspondence among detected human faces by an SVM-based face detection 243 process. Then, the SVM-based behavior recognition 244 is used to identify each person's displayed behavior.

The application can be implemented through the graphical structure of the directional links represented by the process graph 103 within the present reconfiguration architecture. The pool of computational modules can comprise an Adaboost classifier, an object tracker, and SVMs. The data access and transfer schemes among the computational modules can be implemented in a similar manner as described with regard to the demographics classification application in FIG. 3.

Figure 7:
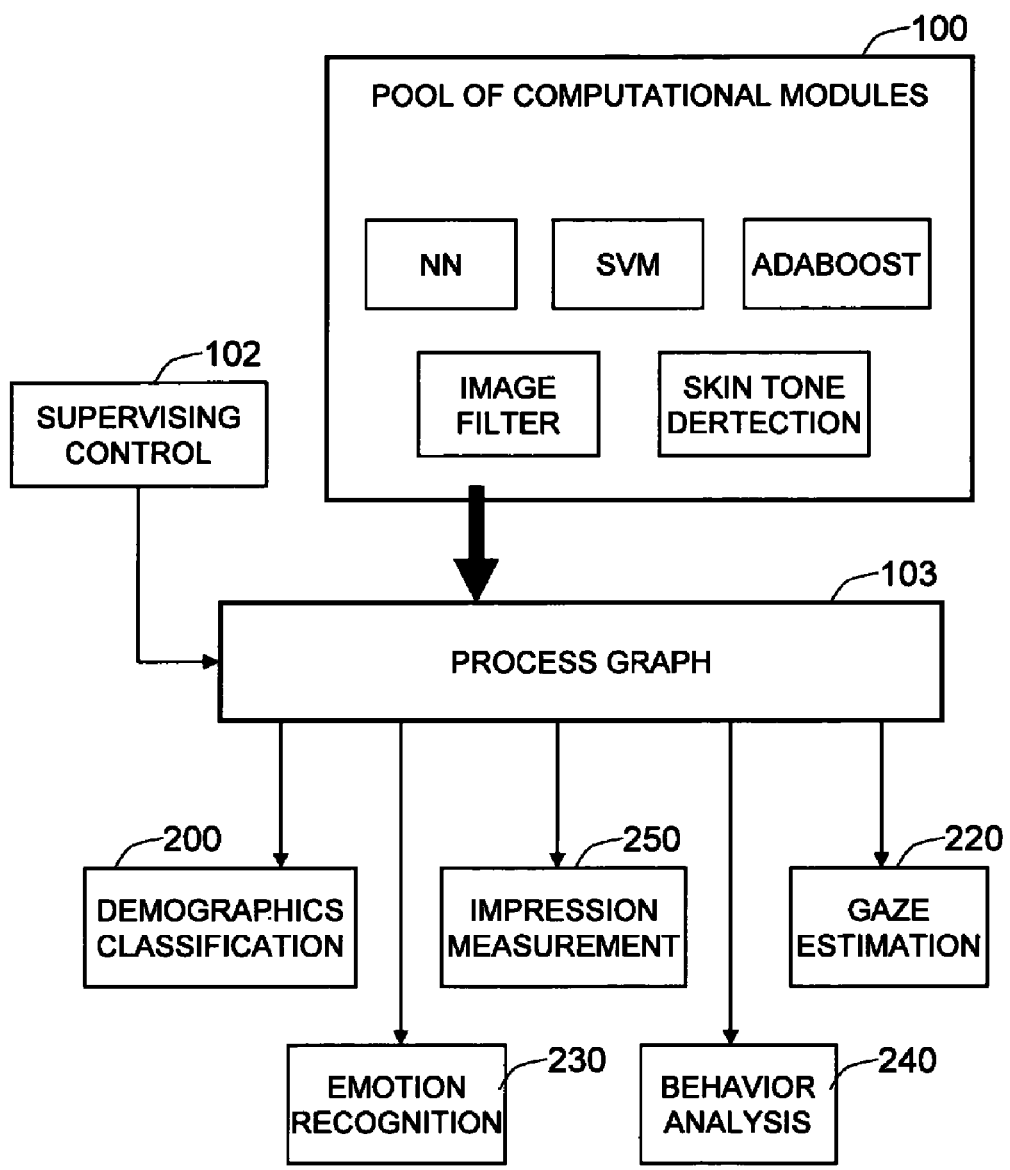
FIG. 7 shows an exemplary embodiment of a pool of computational modules and of a collection of audience measurement applications that can be implemented by the present invention.

FIG. 7 shows an exemplary embodiment of a pool of computational modules and of a collection of audience measurement applications that can be implemented by the present invention.

The pool of computational modules consists of neural networks, SVM, AdaBoost classifier, image filter, and skin tone detection. Constructed from the supervising control 102, the process graph 103 can realize various audience measurement applications, including demographics classification 200, emotion recognition 230, impression measurement 250, behavior analysis 240, and gaze estimation 220.

Figure 8:
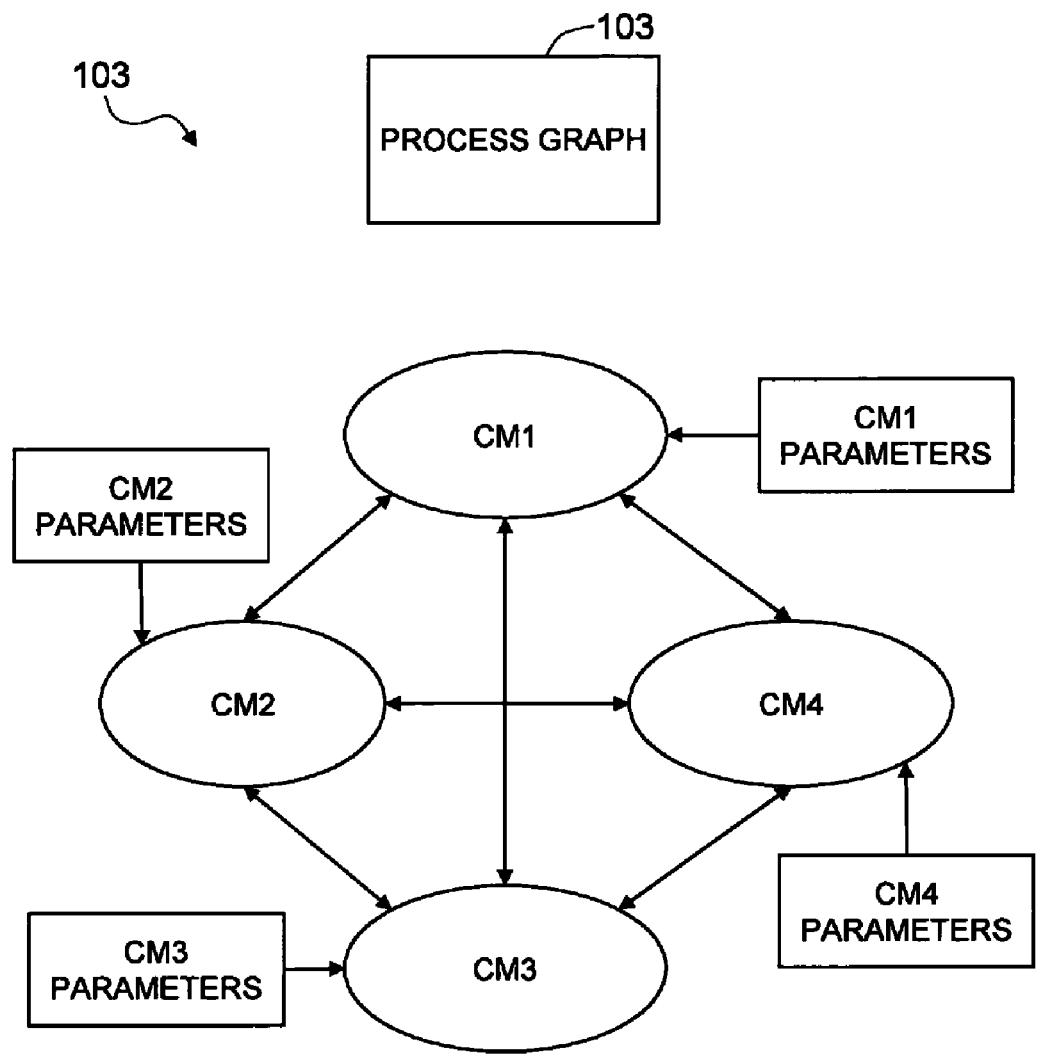
FIG. 8 shows an exemplary embodiment of the process graph that can realize various audience measurement applications.

FIG. 8 shows an exemplary embodiment of the process graph 103 that can realize various audience measurement applications.

In this exemplary embodiment, each of the computational modules (e.g., CM1 through CM 4 in FIG. 8) represents an implementation of a specific computational function, such as neural network, support vector machine, etc. The process graph 103 can effectively map the topology of the processes necessary for the given application, by specifying the presence/absence of directional links between the computational modules. The process graph 103 may take the form of a table, and can be stored in any designated memory of the hardware. The process graph 103 can also include information other than the linkage, such as the pointers to parameters, (e.g., CM1 parameters through CM 4 parameters in FIG. 8), necessary for the given computational modules to carry out the applications. Decision making criteria, regarding the ways in which the processing should continue, can be specified for each potential link between the computational modules. An example of decision making criteria is illustrated in FIG. 9, where the output from each step is compared against a given threshold, and the next step of the processing is determined by the outcome of the comparison.

Figure 9:
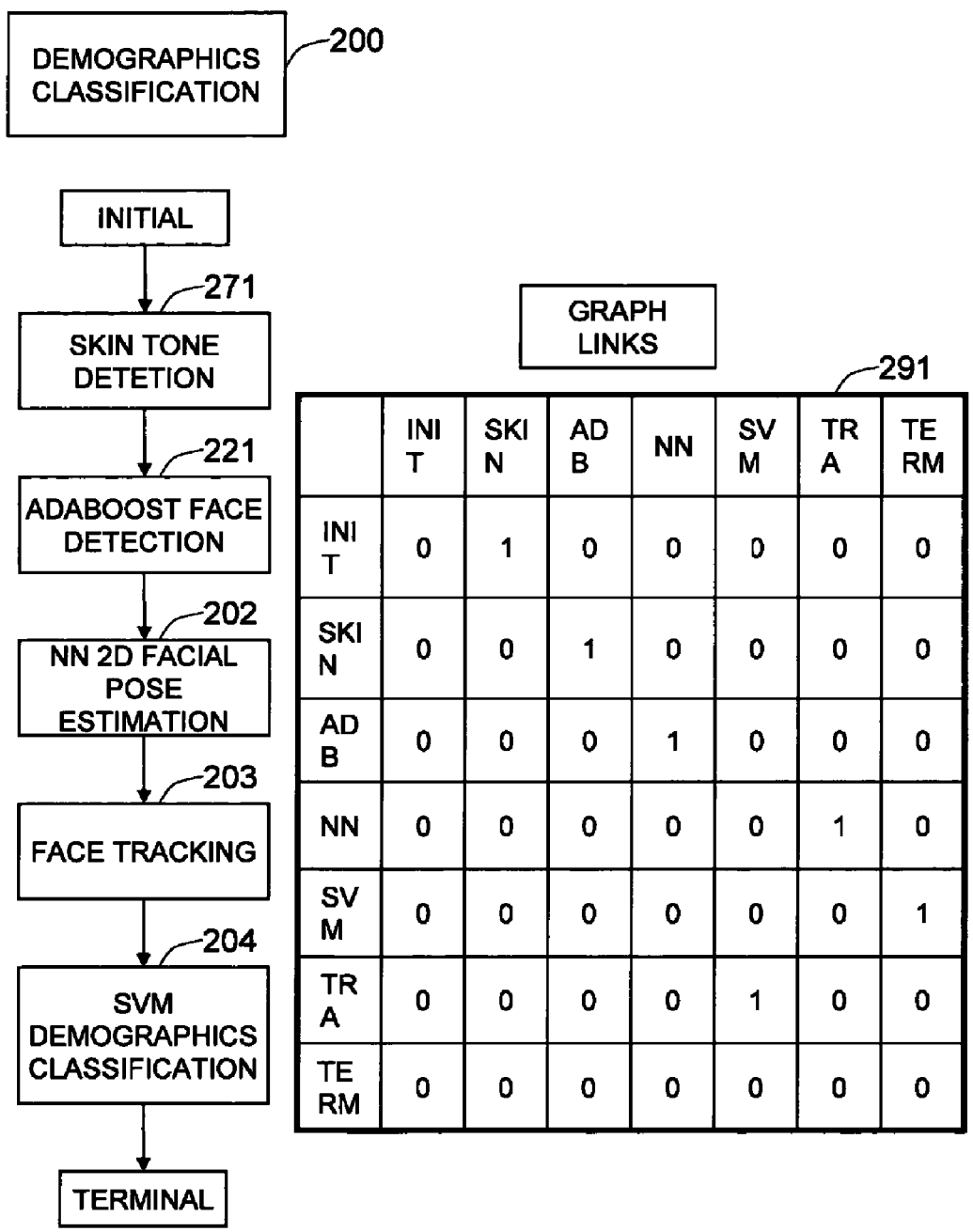
FIG. 9 shows an exemplary embodiment of the process graph that realizes the application of demographics classification.

FIG. 9 shows an exemplary embodiment of the process graph that realizes the application of demographics classification.

In this example, the pool of computational modules consists of skin tone filter, AdaBoost classifier, neural networks, tracker, and SVM classifier. The process graph comprises nodes that represent the computational modules. The process graph 103 also requires an additional two nodes—the initial node and the terminal node. The process graph 103 is realized by a "graph link table 1" 291 that specifies the connection among the computational modules. The process of the application is shown on the left. The process graph 103 that can implement the process is shown in the "graph link table 1" 291. The labels of the nodes in the first column denote the source nodes of the graph links. The labels of the nodes in the first row denote the destination nodes of the graph links. Whenever there is a directional link from a node A to a node B, the corresponding table entry (A, B) should have the "on (e.g., 1)" flag.

The initial node is the first node to be started, which is the initial node symbol in the first row. In the exemplary "graph link table 1" 291, the nonzero entry in the first row corresponds to the node for the skin tone filter. Then, the row corresponding to the skin tone filter (second row) is examined to find out which node is the next—the nonzero element in the row corresponds to the AdaBoost classifier node; therefore, the next computational module is the AdaBoost classifier. The process graph 103 constructs the process for the given application in this manner.

Figure 10:
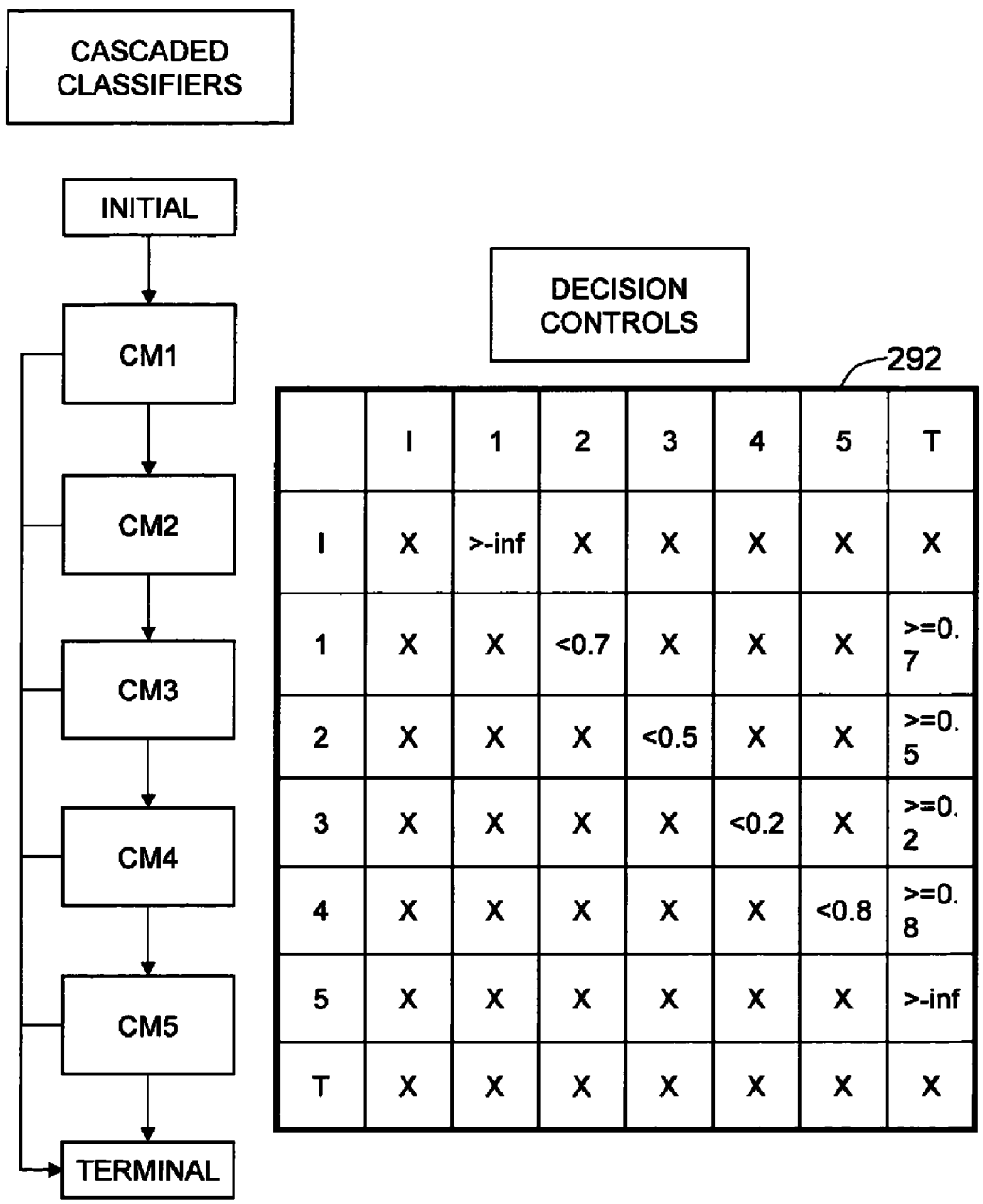
FIG. 10 shows an exemplary embodiment of the process graph that implements the cascaded classifiers.

FIG. 10 shows an exemplary embodiment of the process graph that implements the cascaded classifiers. An example of cascaded classifiers is the Adaboost classifier, where a combination of many weak classifiers (classifiers that do not individually perform high-accuracy classifications) constitutes a classifier.

The pool of computational modules consists of weak classifiers: e.g., "CM1", "CM2", "CM3", "CM4", and "CM5". Each of these classifiers outputs a number that represents some decisions about the classification task. The initial node and the terminal node are added to the process graph 103 as well. The process graph 103 is implemented by a "graph link table 2" 292 that specifies the decision criterion and the branching links for each of the connections between weak classifiers. The labels of the weak classifiers are abbreviated as "1", "2", "3", "4", and "5". The labels of the initial and terminal nodes are abbreviated as "I" and "T". The exemplary "graph link table 2" 292 is constructed to represent the weak classifier topology shown on the figure to the left of the table. The process starts from the initial node ("I"), and the entries in the row (first row for the initial node) represent criteria for deciding whether the process will move to the node represented by the corresponding column label. The process then moves on to "CM1", because a nominal output from the initial node will always satisfy the criterion in the example, i.e., (output>−infinity). Then, the output from "CM1" is fed to each of the decision criterion in the third row. If the output satisfies the criterion in the "CM3" column, i.e., (output<0.7), then the process moves on to "CM3". If the output instead satisfies the criterion in the "T" column (output>=0.7), then the process moves on to the terminal node to be terminated. In this manner, the process graph 103 dictates how the process will branch out to different weak classifiers.

Each entry in the "graph link table 2" 292 can also contain information about 1) the pointer to the data that the corresponding computational module is supposed to process, 2) the pointer to the address at which the output of the computational module should be stored, or 3) any other set of parameters that the computational module should use.

Figure 11:
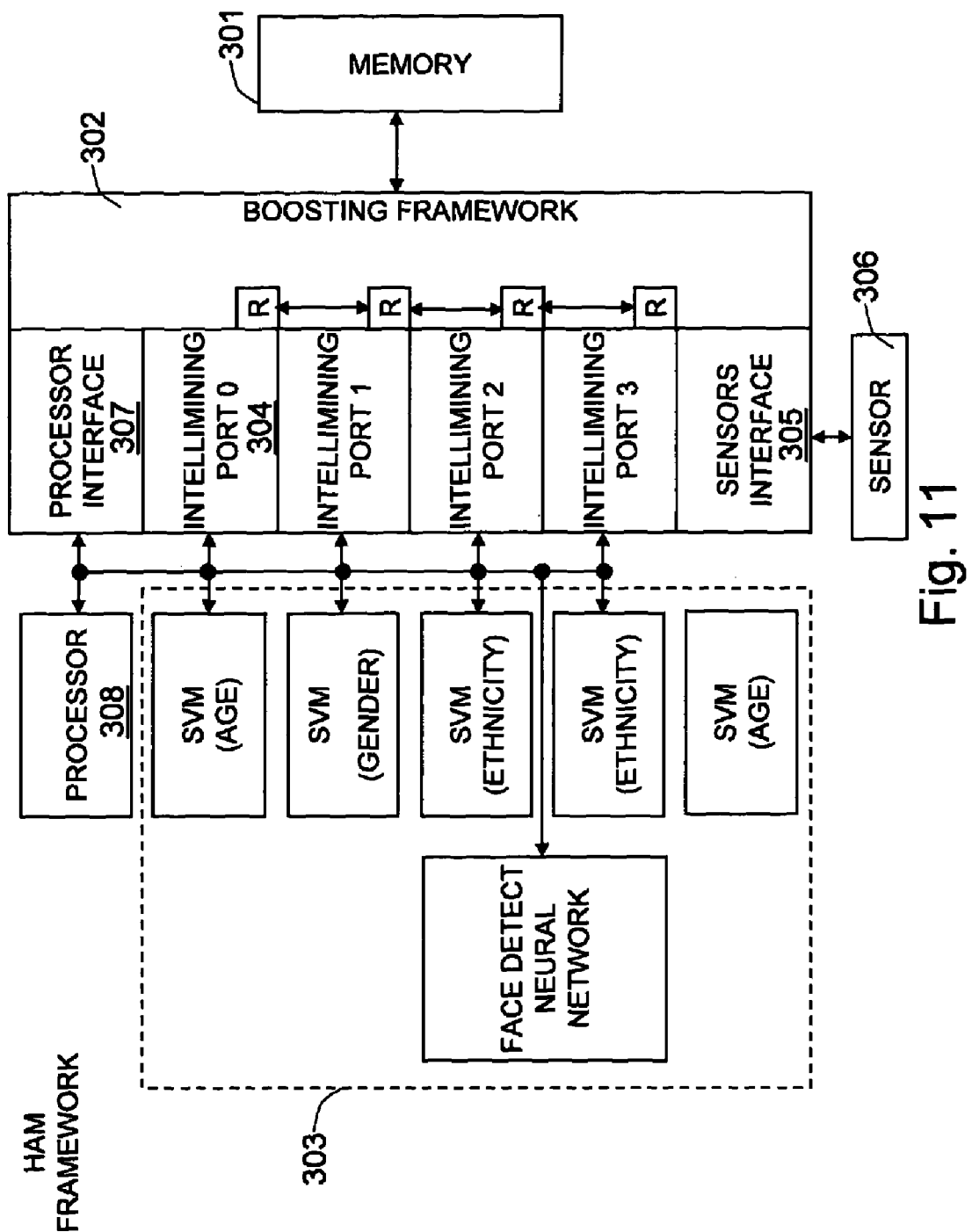
FIG. 11 shows an exemplary embodiment of the HAM system using a boosting framework.

FIG. 11 shows an exemplary embodiment of the HAM system using a boosting framework.

The system consists of memory 301 connected to a network of classification execution modules 303. In an exemplary embodiment of the present invention, a video source acquires image frames, which are subsequently stored in the shared memory. The present invention accesses video frames from the shared memory via a memory interface component. The results of processing an image frame are stored in the shared memory for subsequent retrieval and analysis by the embedded processor. In this exemplary embodiment, all programmable aspects of the present invention can be programmed by the embedded processor. The classification execution modules 303 are exemplary computational modules.

The boosting framework 302 serves the role of memory interface and interconnection network between classification execution modules 303. Classification execution modules 303 generate classification results for regions of interests, hereafter referred to as ROI, and forward the classification result and ROI information to the boosting framework 302 via an intellimining port 304. The intellimining port 304 determines if the classification result is significant enough to propagate to additional classification execution modules 303 in the system. The sensor interface 305 provides a connection between a sensor 306 and memory 301. The processor interface 307 provides a connection between a processor 308, memory 301, and classification execution modules 303. The processor 308 controls configuration of classification execution modules 303 and intellimining ports 304. A classification execution module 303 can be wholly or partially implemented in software that executes on the processor 308.

Figure 12:
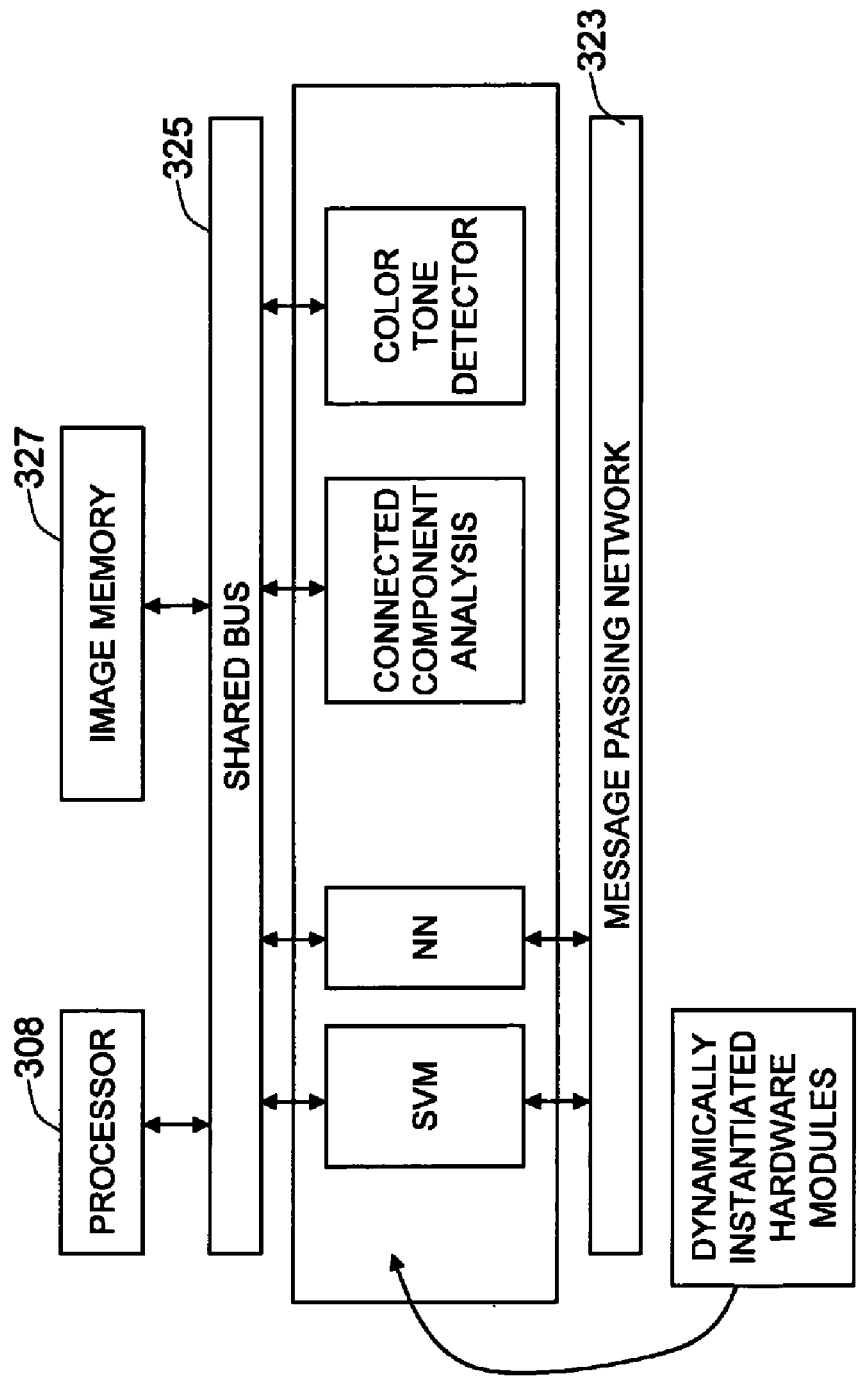
FIG. 12 illustrates another exemplary embodiment of HAM.

FIG. 12 illustrates another exemplary embodiment of HAM.

An exemplary hardware architecture of the embodiment is shown later with regard to FIG. 17. The architecture consists of at least a single classification processor wrapper (CPW) 321. A CPW encompasses a reconfigurable classification processing element (CPE) 322 that performs a specific classification task that may need to be changed over time. The classification processor wrapper can be considered as an exemplary hardware implementation of a computational module. Two or more CPW pass messages using a message passing network 323 that utilizes packet switches (PS) 324. Each CPW connects to a shared bus 325 that allows access to image memory 327 and the host processor 308. The host processor 308 performs configuration of the CPW and associated CPE 322 modules, and may issue classification task requests to CPE 322 modules. The shared memory 327 stores image data and any other data that should be accessible by any device on the shared bus 325.

Figure 13:
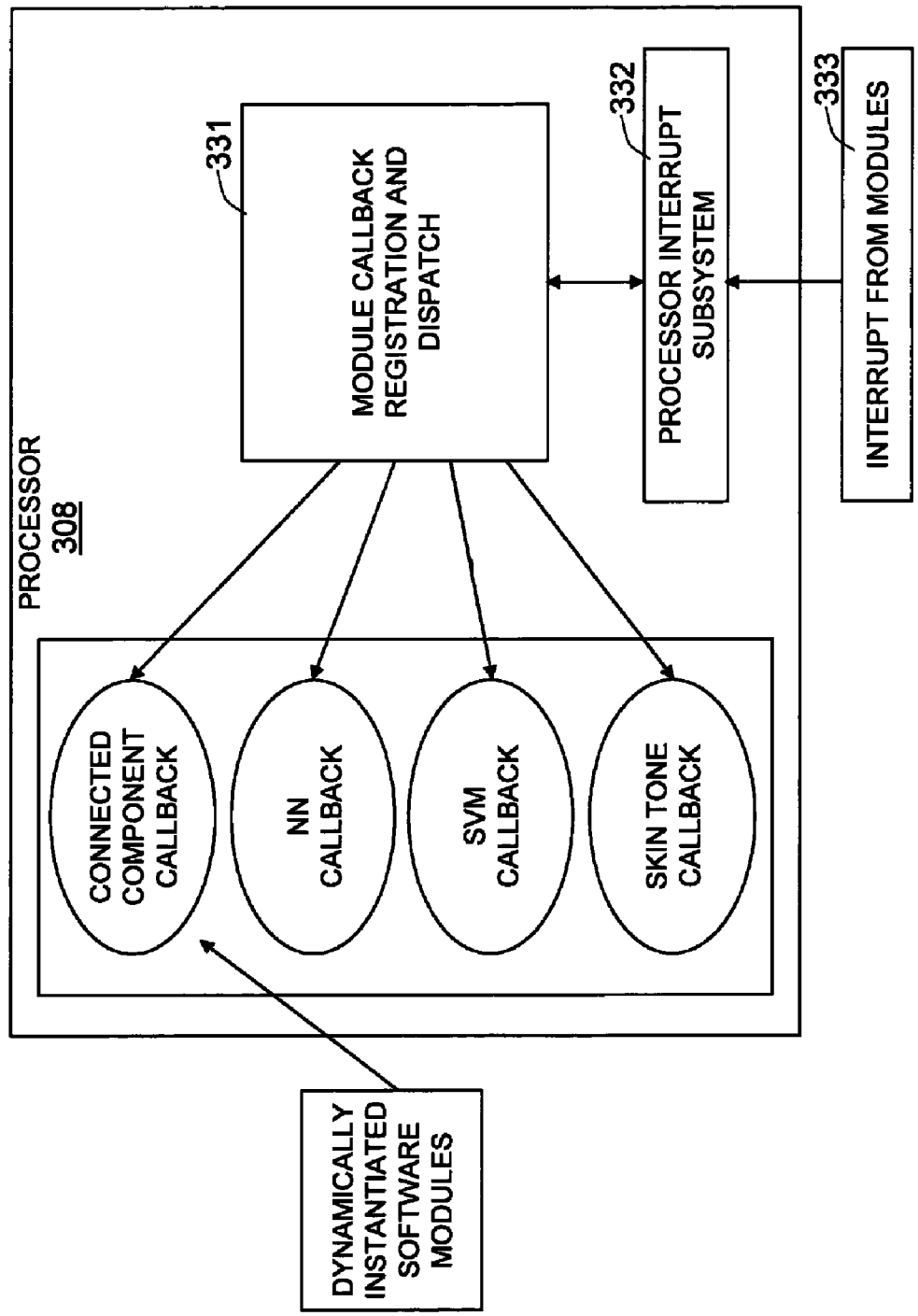
FIG. 13 illustrates an exemplary embodiment of the software architecture that supports the HAM hardware platform.

FIG. 13 illustrates an exemplary embodiment of the software architecture that supports the HAM hardware platform.

The host processor 308 provides software support for the classification processing element (CPE) 322. When a CPE 322 is instantiated in the HAM platform, an optional interrupt service routine (ISR) may be loaded and associated with the CPE interrupt signal. During normal operation, an interrupt may be generated by a CPE module, e.g. 333. The interrupt is detected by the processor interrupt subsystem 332, which alerts the module callback registration and dispatch (MCRD) 331 module. The MCRD queries each CPE 322 to determine the source of the interrupt. Once the interrupting CPE is determined, its interrupt queue 384 is read to obtain information about the nature of the interrupt. The MCRD resolves the appropriate ISR that should be called for the given interrupt source. The ISR is called by the MCRD and the interrupt is acknowledged.

Figure 14:
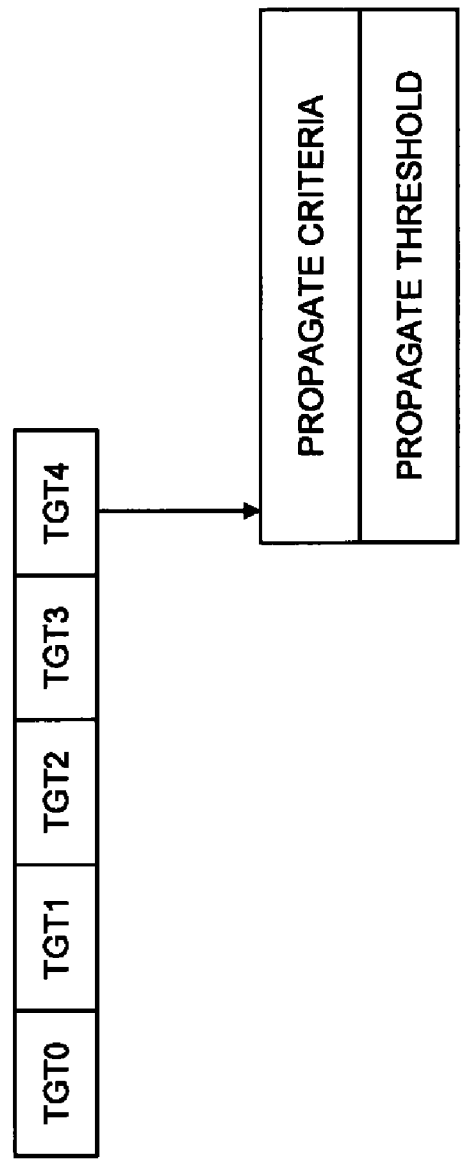
FIG. 14 shows an exemplary propagate criteria structure.

FIG. 14 shows an exemplary propagate criteria structure 341, hereafter referred to as PCS.

For each potential target of a classification result produced by a particular classification execution module, there is an associated PCS. The PCS consists of a propagate criteria and a propagate threshold. The propagate criteria specifies the function that should be used to compare the result with the propagate threshold.

Figure 15:
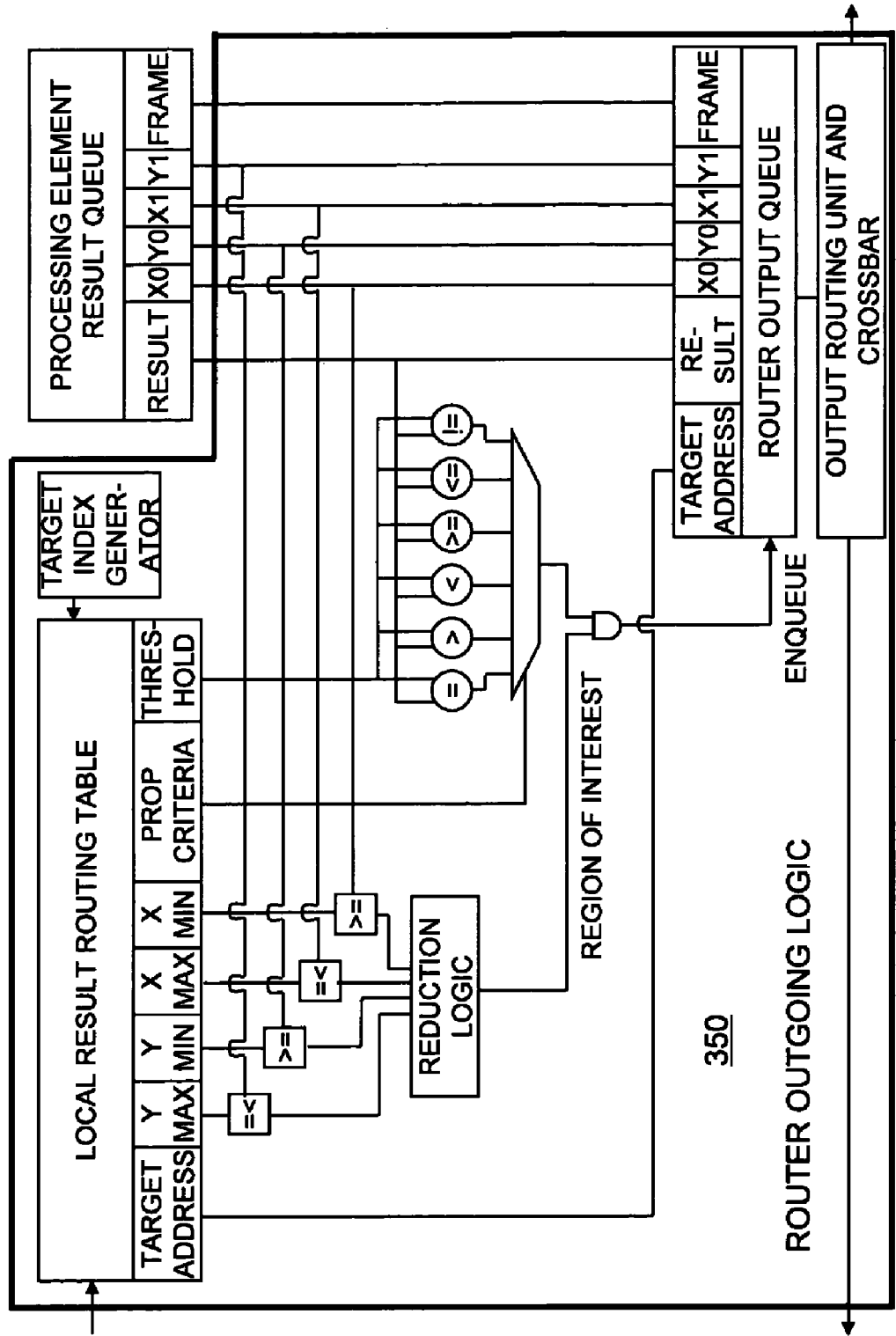
FIG. 15 illustrates the details of the result propagate circuitry within the intellimining port.

FIG. 15 illustrates the details of the result propagate circuitry 350 within the intellimining port 304.

The target index generator produces indices into the local result routing table for each target that has subscribed to the results of a particular classification execution module. An entry within the local result routing table consists of target address, Ymax coordinate, Ymin coordinate, Xmax coordinate, Xmin coordinate, propagate criteria, and propagate threshold.

The result queue contains the classification results produced by the classification execution module. An entry in the queue consists of a result, Xmax coordinate, Xmin coordinate, Ymax coordinate, Ymin coordinate, and frame information. The propagate criteria is connected to the select input of a multiplexer that selects one output from a plurality of comparison functions. Each comparison function compares the result with the threshold. Simultaneously, the ROI coordinates are compared with the ROI information in the propagate criteria. The reduction logic output is asserted when the result region coincides with the bounding region. If the output of the reduction logic and the output of the selected comparison function are asserted, the enqueue signal is asserted. The assertion of the enqueue singal causes the result information to be inserted into the result output queue. Subsequently the result information is forwarded to the appropriate classification execution module.

Figure 16A:
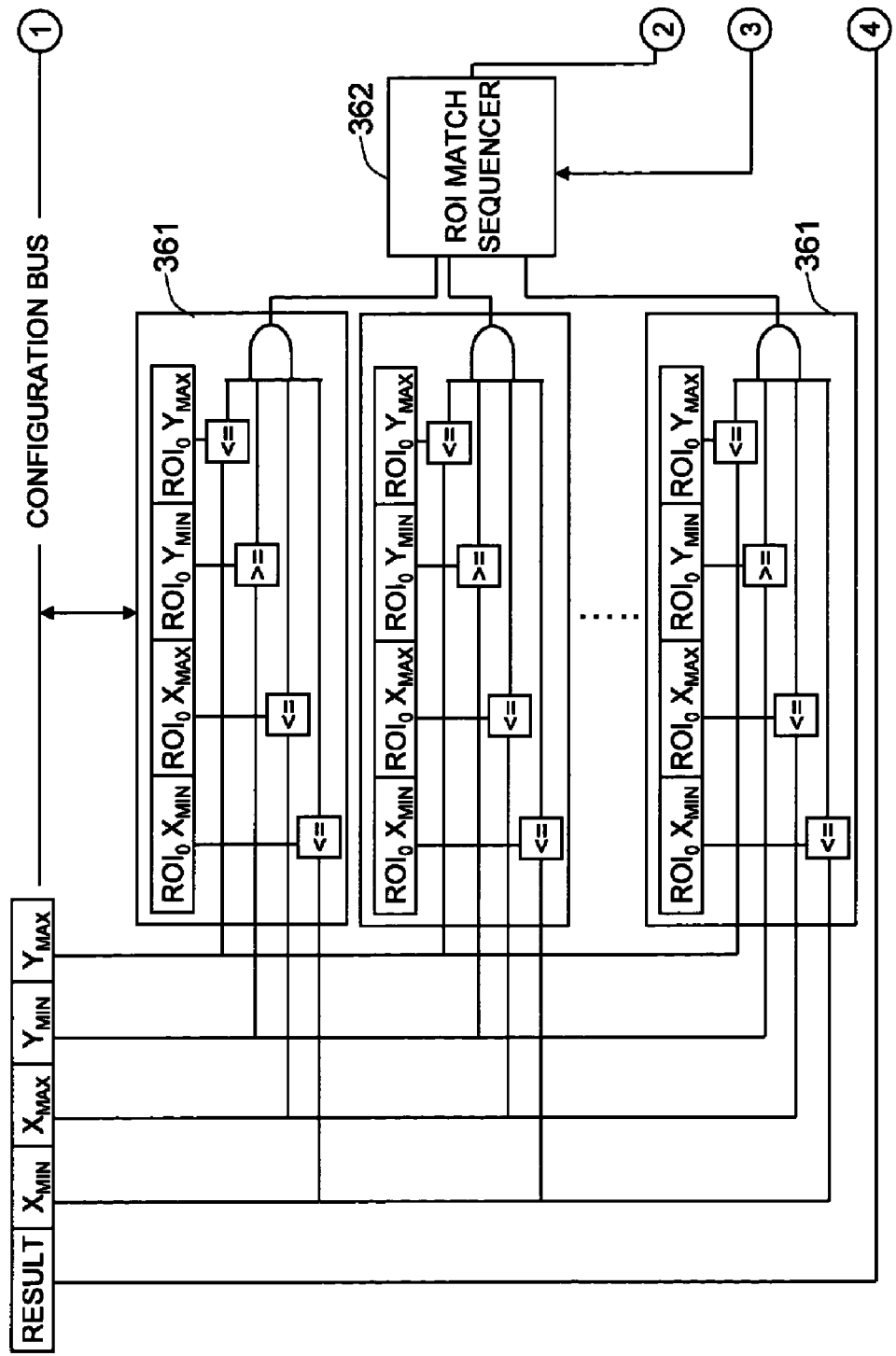
FIG. 16A shows a part of a second implementation of the propagate circuitry.
Figure 16B:
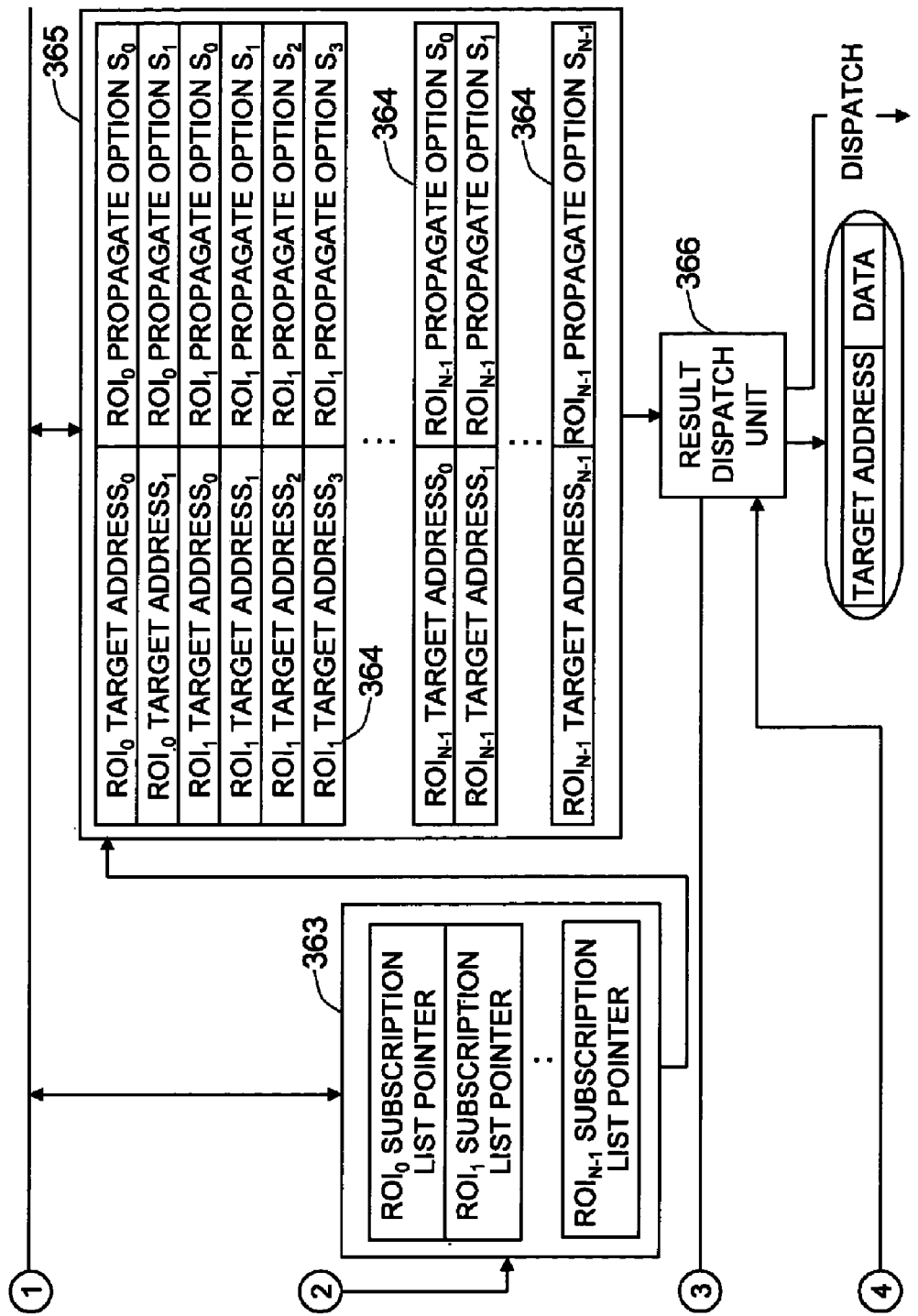
FIG. 16B shows a part of a second implementation of the propagate circuitry.

FIG. 16a and FIG. 16b show a second implementation of the propagate circuitry.

In this example, each ROI match unit 361 independently compares the ROI of a result with the ROI information configured for that ROI match unit 361. The ROI match unit 361 is configured via a configuration bus. The match status of each ROI match unit is input to the ROI match sequencer 362. The ROI match sequencer 362 generates an index into the subscription list table 363. The subscription list table 363 contains the pointers to the start of a list of propagate criteria groups 364 stored in the propagate criteria table 365. Each propagate group in a list is forwarded to the result dispatch unit 366.

Figure 17:
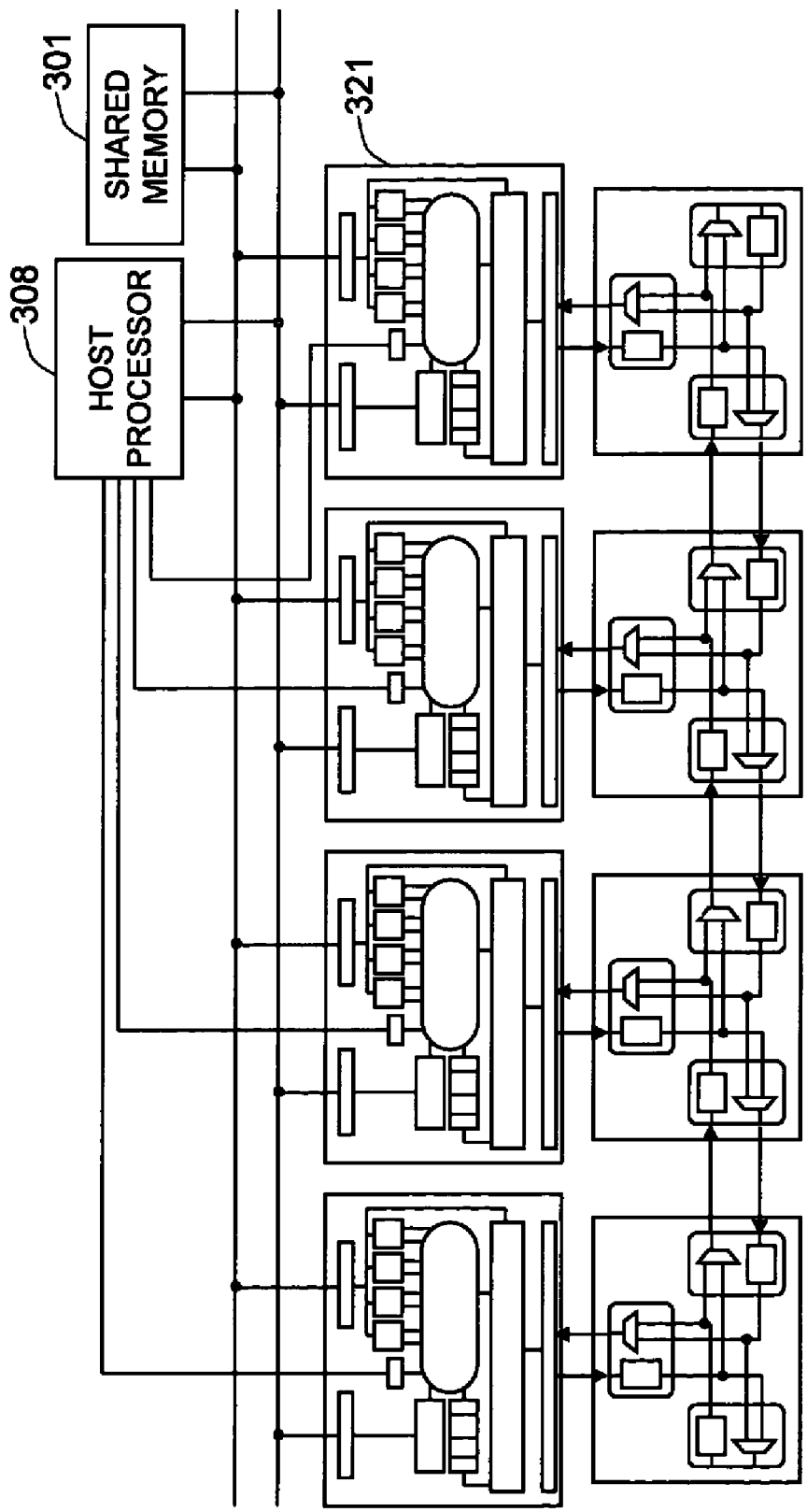
FIG. 17 shows exemplary hardware architecture of the exemplary embodiment of HAM illustrated in FIG. 12.
Figure 18:
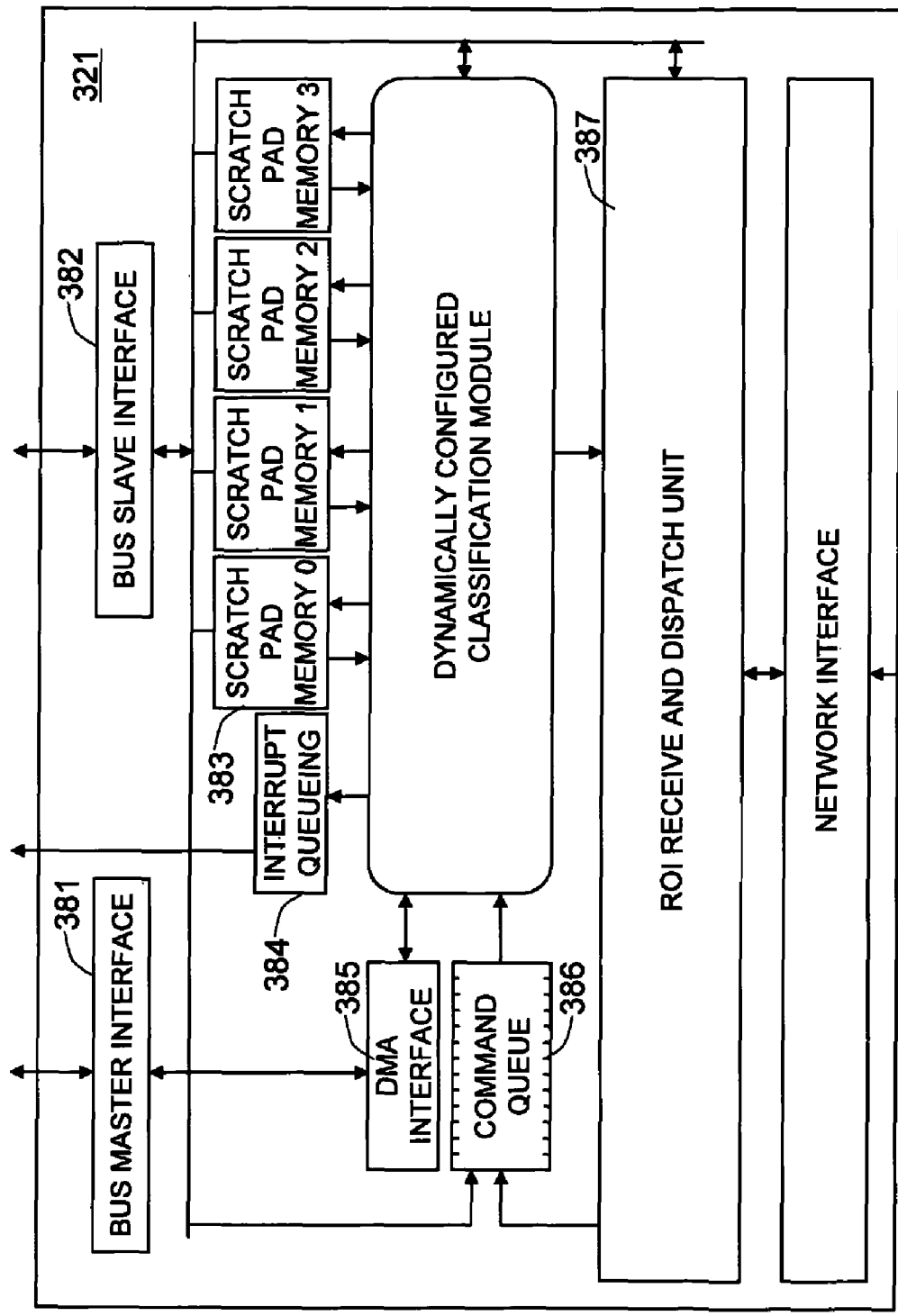
FIG. 18 shows an exemplary embodiment of the classification processor wrapper that provides a standard set of resources for a classification processing element.

FIG. 17 shows exemplary hardware architecture of the exemplary embodiment of HAM illustrated in FIG. 12. FIG. 18 shows an exemplary embodiment of the classification processor wrapper (CPW) 321 that provides a standard set of resources for a classification processing element (CPE) 322.

The CPE 322 provides the functionality of a specific classification task, such as gender classification, facial pose estimation, and ethnicity classification. A CPE 322 can be dynamically reconfigured to alter the classification task. Reconfiguration of a CPE 322 does not affect the operation of other CPEs 322 in the system.

Read and write access to the CPW by external devices is facilitated by the bus slave interface (BSI) 382. The BSI allows external devices, such as the host processor, to access configuration registers and scratch pad memory via the shared bus 325. The bus master interface (BMI) 381 allows the CPE 322 to issue data transactions to other slave devices on the shared bus 325.

In an exemplary embodiment, a CPW consists of four scratch pad memory (SPM) 383 modules. Typically, SPM modules are used to store image data or temporary data needed by the CPE 322. The CPE 322 can read and write each of the four SPMs as dictated by the classification task. The size of each SPM is arbitrary. Each SPM is accessible via the bus slave interface (BSI) 382. Each SPM is given a contiguous address range in the global address space and is readable and writable by any master device on the shared bus 325.

The DMA interface 385 provides a mechanism for the CPE 322 to move blocks of data to and from image memory 327 or SPM 383. The CPE 322 issues commands to the DMA interface. The DMA interface subsequently interacts directly with the bus master interface to initiate the request on the shared bus 325.

The interrupt queuing (IQ) 384 module provides a FIFO interface for the CPE 322 to alert the host processor 308 of critical events, such as the completion of a classification task. If the queue contains at least one entry, an interrupt is propagated to the host processor 308. An entry in the IQ 384 contains information detailing the nature of the interrupt generated by the CPE 322. The host processor 308 reads entries in the IQ via the bus slave interface 382. Each CPE 322 that can generate an interrupt has an associated software interrupt callback routine.

The command queue 386 queues command descriptors for ordered processing by the CPE 322. Command descriptors may be inserted by the ROI receive and dispatch unit (ROI-RDU) 387 or by an external device via the bus slave interface 382.

A fundamental feature of the HAM device is the ability to conditionally forward the result of a classification task to a subsequent classification task. The decision to propagate a result originating from one CPE 322 to a second CPE 322 is based upon the physical location of the image region from which the result was generated and the numerical value of the result. The ROI receive and dispatch unit (ROI-RDU) 387 performs the propagate decision for all results generated by the CPE 322. If the result passes the propagate criterion for a given target CPE, the ROI-RDU 387 encapsulates the result into a command packet and forwards it to the target CPE. Otherwise, the result is not propagated to the target CPE. The ROI-RDU 387 maintains the information needed to perform the propagate decision for all CPE modules that are configured, to receive results from the originating CPE. The ROI-RDU 387 also receives command packets from remote CPE modules and, if required, converts the command packet into a command descriptor and inserts it into the command queue 386.

Figure 19:
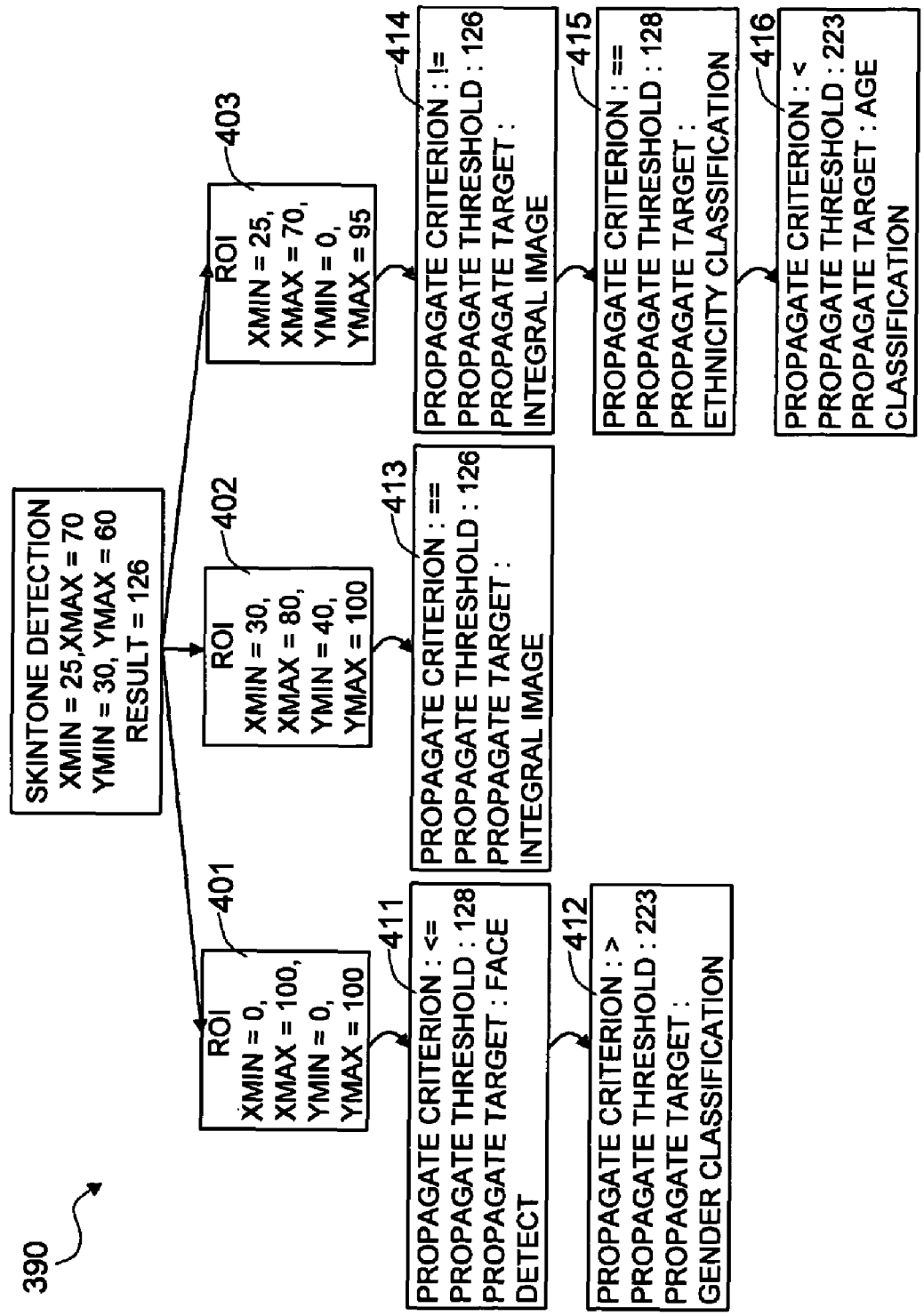
FIG. 19 illustrates an exemplary region of interest task graph (ROITG) that is mapped to a specific region of interest receive and dispatch unit (ROI-RDU).

FIG. 19 illustrates an exemplary region of interest task graph (ROITG) 390 that is mapped to a specific ROI-RDU 387.

The graph describes the direction and condition of flow from the classification processing element (CPE) 322 associated with the ROI-RDU 387 to a secondary CPE 322. An output result is generated by the CPE 322 at the completion of a classification task. The output result specifies the final numerical value of the computation performed and the 2D region within the image on which the computation was performed. The final numerical value of the computation is specified by the result field. The 2D region is described by Xmin, Xmax, Ymin, and Ymax fields.

The output result is compared with a set of ROI descriptors, e.g., 401, 402, and 403. The Xmin, Xmax, Ymin, and Ymax fields of the ROI descriptor define a 2D region within the image. The ROI descriptor points to a list of propagate criteria descriptors (PCD), e.g., 411, 412, 413, 414, 415, and 416 that should be traversed in the case that the 2D region specified by the output result lies within the bounds of the 2D region specified by the ROI descriptor.

A propagate criteria descriptor consists of propagate criterion, propagate threshold, and propagate target fields. The propagate criterion and propagate threshold specify the condition of the result field that must be met in order for the output result to be forwarded to the classification processing element specified by the propagate target field. The propagate criterion specifies the equality relationship that should be used to compare the result field and the propagate threshold. The propagate criterion may specify one of six equivalence relationships: "equal", "not-equal", "greater-than", "less-than", "greater-than-or-equal", or "less-than-or-equal".

An output result may match with many ROI descriptors. The output result must be validated with each propagate criteria descriptor in the list of descriptors specified by each matching ROI Descriptor.

While the above description contains much specificity, these should not be construed as limitations on the scope of the invention, but as exemplifications of the presently preferred embodiments thereof. Many other ramifications and variations are possible within the teachings of the invention. Thus, the scope of the invention should be determined by the appended claims and their legal equivalents, and not by the examples given.

What is claimed is:

1. An apparatus for measuring audience data from at least an image stream using dynamically-configurable hardware architecture, comprising:

a) means for aggregating computational modules using a directed graph,
wherein every vertex of the graph represents a computational module that implements a classifier or a computational component that constitutes a classifier, and every edge of the graph between a first computational module and a second computational module represents a decision of whether or not the processing goes from the first computational model to the second computational module and any data that need to be passed from the first computational module and the second computational module, b) means for determining an audience measurement hardware architecture and the computation that the architecture carries out, based on the presence and absence of the edges between the vertices and the kind of computation that is represented by the edge in the graphical model, c) a supervising control to change the hardware configuration in executing the computational modules in the system,
wherein the supervising control monitors the external or internal environment to make a decision whether or not it is necessary to reconfigure the system to adjust to the changes in environment,
wherein the supervising control then makes a decision about how to change the hardware configurations to adapt to the given environment, and
wherein the audience data comprises the behavioral attributes and demographics of the audience per node.

2. The apparatus according to claim 1, wherein the apparatus further comprises means for supporting multiple neural network configurations simultaneously.

3. The apparatus according to claim 1, wherein the apparatus further comprises means for measuring behavior analysis.

4. The apparatus according to claim 1, wherein the apparatus further comprises means for estimating the gaze of the audience.

5. The apparatus according to claim 1, wherein the apparatus further comprises means for recognizing the emotion of the audience.

6. The apparatus according to claim 1, wherein the apparatus further comprises means for classifying the demographics of the audience.

7. The apparatus according to claim 1, wherein the apparatus further comprises at least a part for at least a common computational element,
wherein the computational element is developed based on at least a classification algorithm including neural network and support vector machine, and
wherein the computational element is developed based on at least an image processing algorithm including image filtering.

8. The apparatus according to claim 1, wherein the apparatus further comprises means for reusing at least a computational module to carry out different tasks,
wherein the computational module comprises neural network module and support vector machine module.

9. The apparatus according to claim 1, wherein the apparatus further comprises modules according to a high-level topology for a set of computational modules and image filters, wherein the attributes for the computational modules and image filters are set up according to at least a specification of at least a task, and wherein the task comprises behavior measurement, traffic count, dwell time measurement, impression measurement, gaze estimation, emotion change detection, and demographic classification.

10. The apparatus according to claim 1, wherein the apparatus further comprises means for reconfiguring the topology for a set of computational modules and image filters.

11. The apparatus according to claim 1, wherein the apparatus further comprises means for setting different sets of parameters for different tasks for each computational module, wherein the parameters comprise model parameters and weights according to changes in the architecture of the module.

12. The apparatus according to claim 1, wherein the apparatus further comprises means for using a subset of the computational modules depending on the task.

13. The apparatus according to claim 1, wherein the apparatus further comprises means for statically configuring the hardware platform for a different image processing algorithm comprising face detection and expression recognition, wherein the static configuration enables spatial diversity where different instances of the same hardware implement a different algorithm.

14. The apparatus according to claim 1, wherein the apparatus further comprises means for configuring the hardware platform for a different algorithm at a different time, wherein the temporal reconfiguration allows the apparatus a dynamic adaptation to environment.

15. The apparatus according to claim 1, wherein the apparatus further comprises means for dynamic adaptation of implemented algorithm, based on a dynamically-recognized scene.

16. The apparatus according to claim 1, wherein the apparatus further comprises means for dynamic adaptation to resource constraints, wherein the algorithm implemented on one instance of the hardware is changed based on configuration of adjacent nodes.

17. The apparatus according to claim 1, wherein the apparatus further comprises means for providing a unified schema for inter-module capability and output format sharing, wherein a support vector machine module configured on the platform publishes to other modules in the system a set of information in a standard scheme.

18. The apparatus according to claim 1, wherein the apparatus further comprises means for providing a boosting framework for any classifier that is resident in the system, wherein the boosting is an environment in which the modules are instantiated, and wherein the modules use the outputs of any other modules through the boosting interface to form a cascade of weak classifiers.

19. A method for measuring audience data from at least an image stream using a dynamically-configurable hardware architecture, comprising the steps of:

a) aggregating computational modules using a directed graph, wherein every vertex of the graph represents a computational module that implements a classifier or a computational component that constitutes a classifier, and every edge of the graph between a first computational module and a second computational module represents a decision of whether or not the processing goes from the first computational module to the second computational module and any data that need to be passed from the first computational module and the second computational module, b) determining an audience measurement hardware architecture and the computation that the architecture carries out, based on the presence and absence of the edges between the vertices and the kind of the computation that is represented by the edge in the graphical model, c) utilizing a supervising control to change the hardware configuration in executing the computational modules in the system, wherein the supervising control monitors the external or internal environment to make a decision of whether or not it is necessary to reconfigure the system to adjust to the changes in environment, wherein the supervising control then makes a decision about how to change the hardware configurations to adapt to the given environment, and wherein the audience data comprises behavioral attributes and demographics of the audience per node.

20. The method according to claim 19, wherein the method further comprises a step of constructing modules according to a high-level topology for a set of computational modules and image filters, wherein the attributes for the computational modules and image filters are set up according to at least a specification of at least a task, and wherein the task comprises behavior measurement, traffic count, dwell time measurement, impression measurement, gaze estimation, emotion change detection, and demographic classification.

* * * * *